Aug. 30, 1960     J. W. HOLDEMAN ET AL     2,950,629
TRANSMISSION CONTROLS
Filed June 21, 1954     8 Sheets-Sheet 1
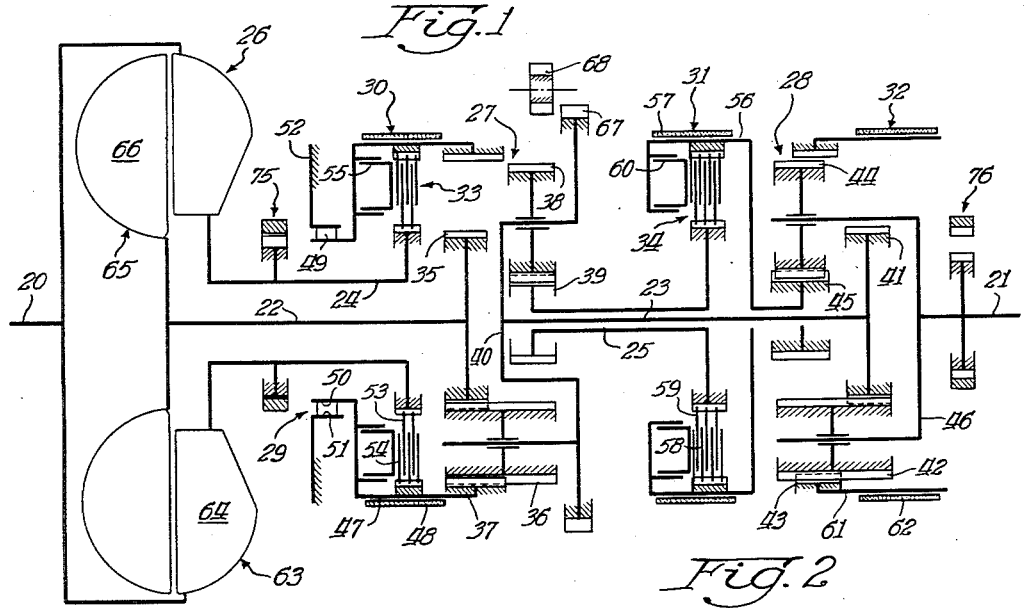
Fig. 1
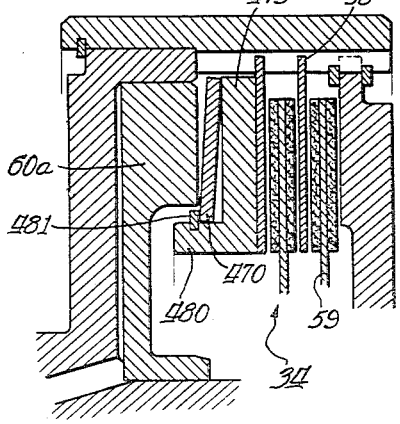
Fig. 10
Fig. 2
| GEAR | $C_{33}$ | $C_{34}$ | $B_{30}$ | $B_{31}$ | $B_{32}$ | RATIO |
|------|----------|----------|----------|----------|----------|-------|
| R | | ✓ | ✓ | | | 10.36 |
| N | | | ✓ | | | — |
| 1 | | | ✓ | | ✓ | 8.28 |
| 2 | | | | ✓ | ✓ | 4.23 |
| 3 | | ✓ | | ✓ | | 2.16 |
| 4 | ✓ | | | ✓ | | 1.47 |
| 5 | ✓ | ✓ | | | | 1.00 |
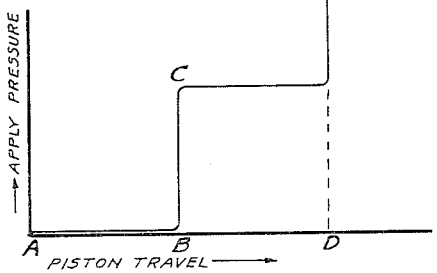
Fig. 11
Inventors:
John W. Holdeman and
John B. Polomski
By: Keith J. Bleue
Atty.

Aug. 30, 1960 J. W. HOLDEMAN ET AL 2,950,629
TRANSMISSION CONTROLS
Filed June 21, 1954 8 Sheets-Sheet 2
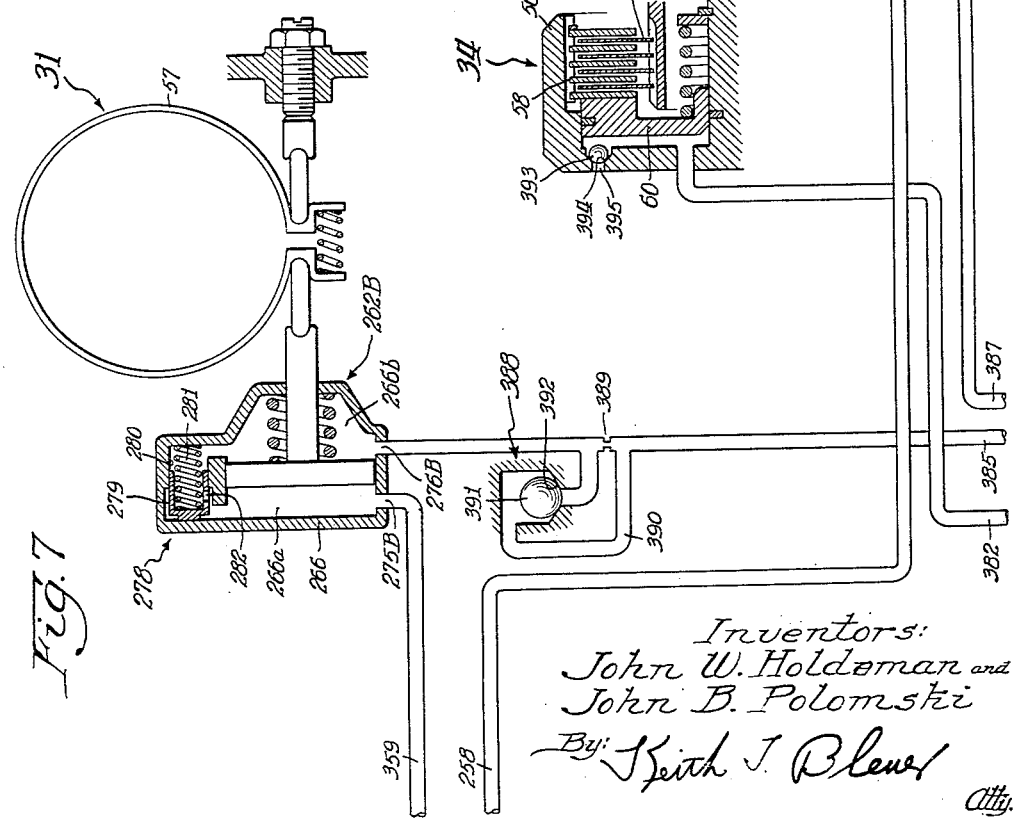
Inventors:
John W. Holdeman and
John B. Polomski
By: Keith J. Blew
Atty.

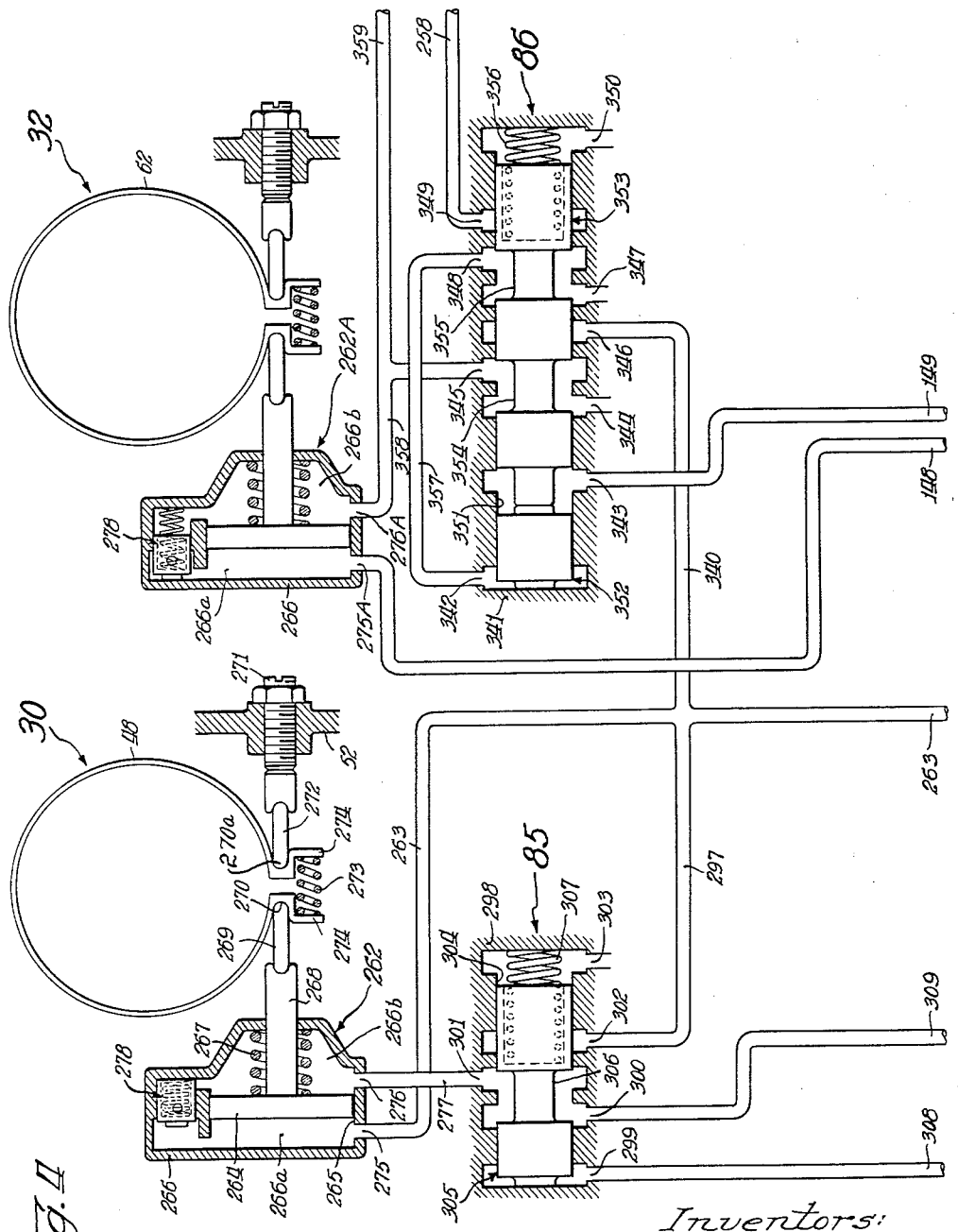

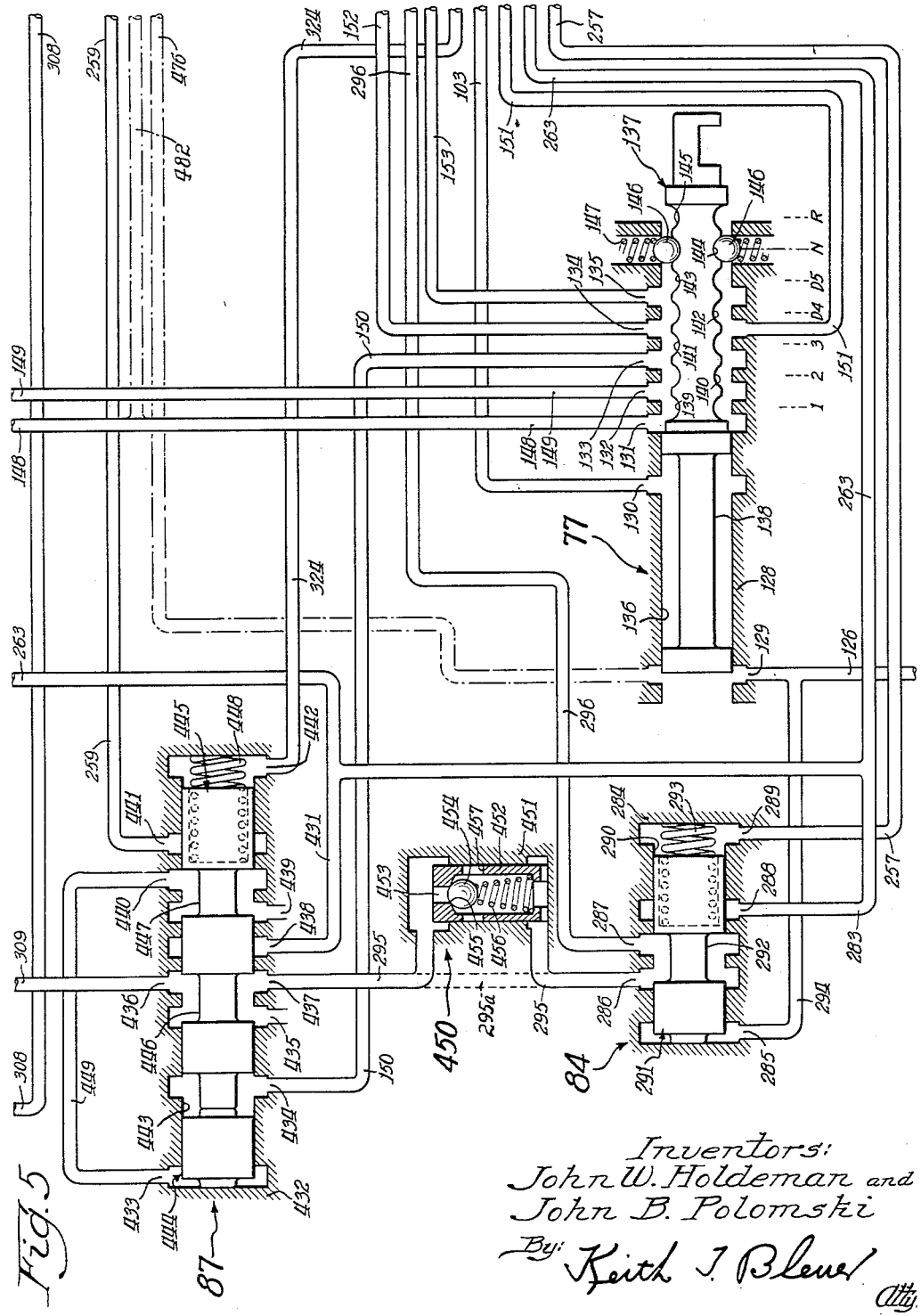

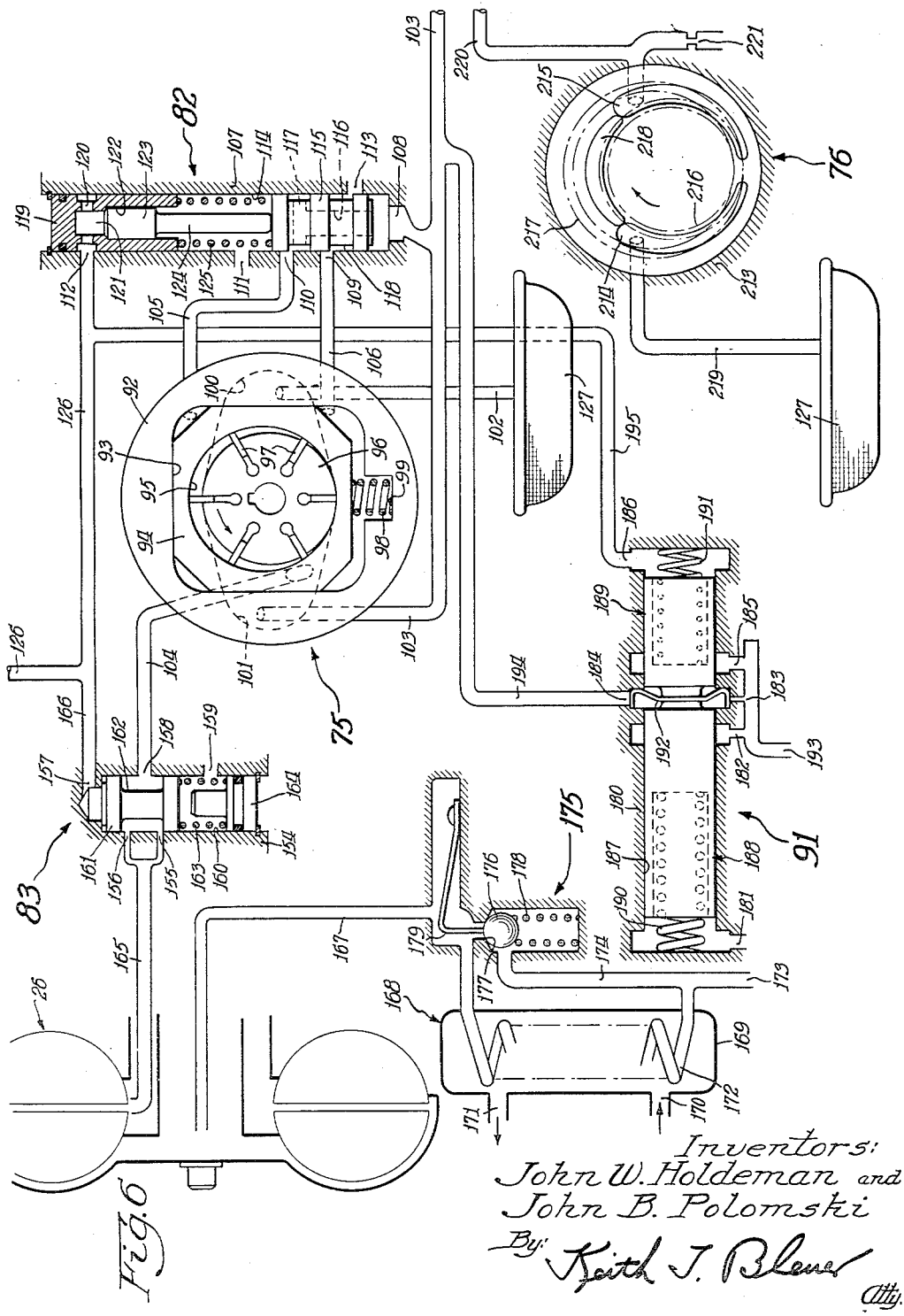

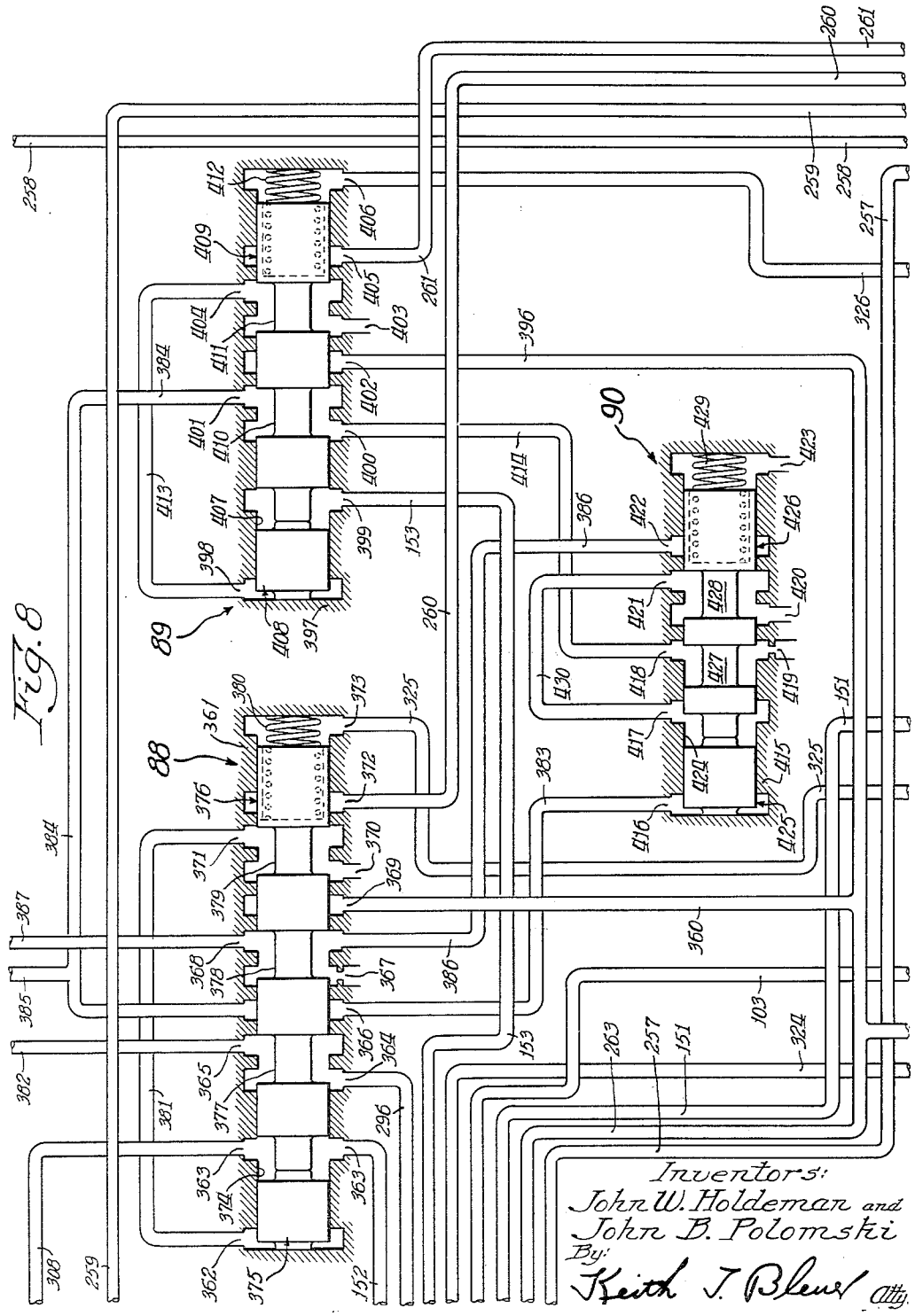

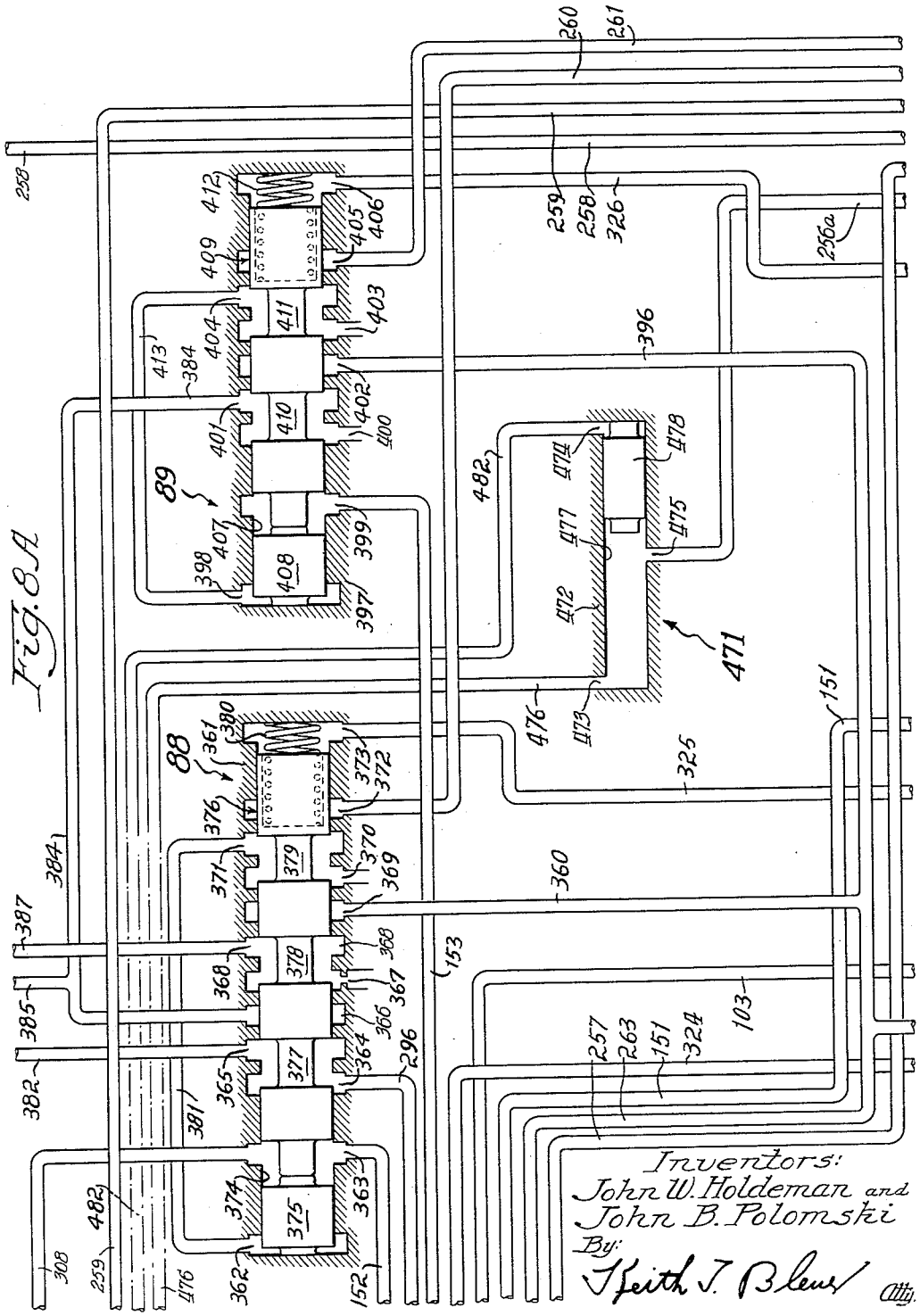

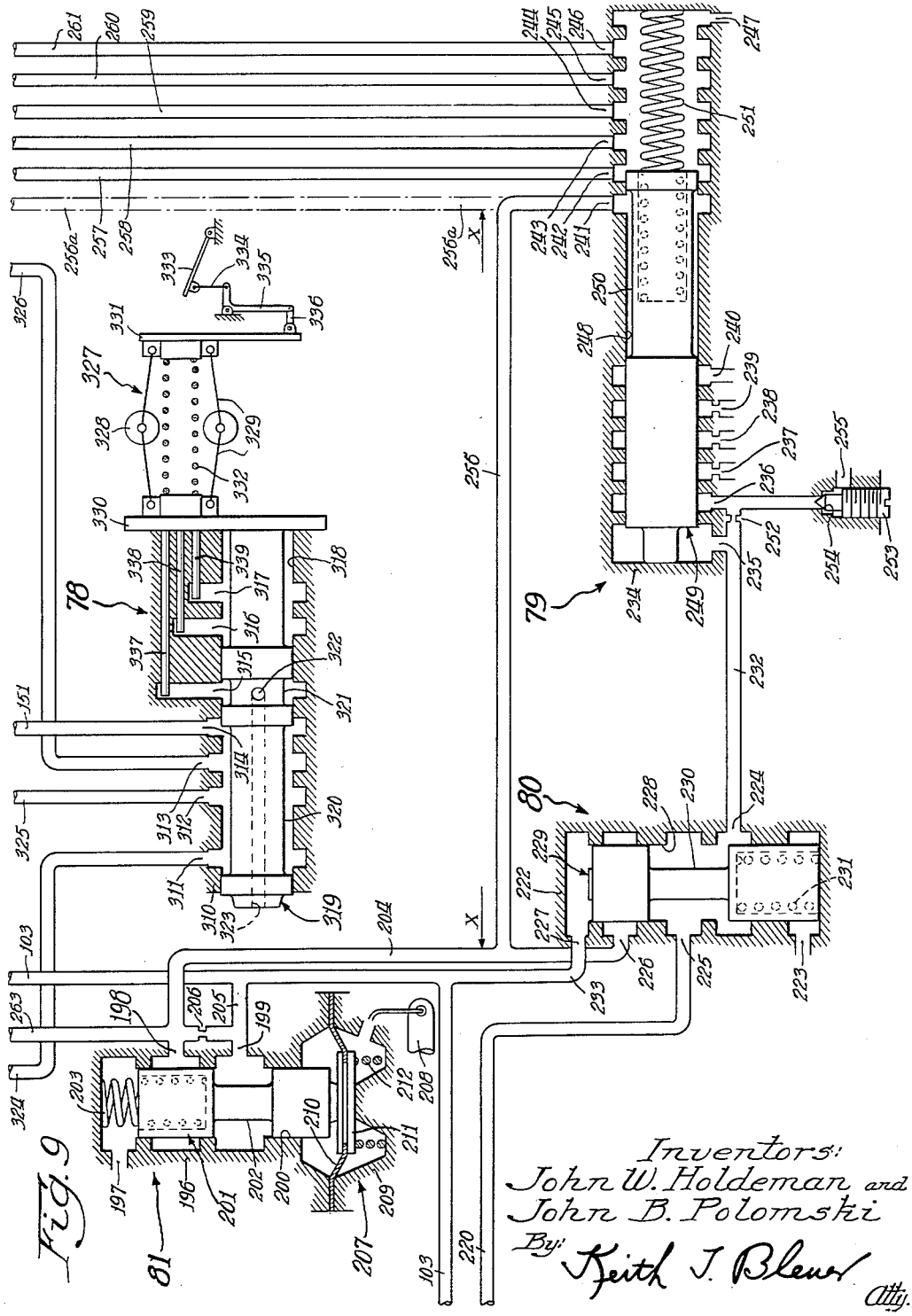

United States Patent Office 2,950,629
Patented Aug. 30, 1960

2,950,629

TRANSMISSION CONTROLS

John W. Holdeman and John B. Polomski, Detroit, Mich., assignors to Borg-Warner Corporation, Chicago, Ill., a corporation of Illinois Filed June 21, 1954, Ser. No. 438,079

16 Claims. (Cl. 74—472)

Our invention relates to transmissions and more particularly to transmissions for heavy vehicles such as trucks.

It is an object of the present invention to provide improved hydraulic controls for a transmission having five different speed ratios in forward drive, and it is an object to provide selecting means under the control of the vehicle operator whereby he may at his option select either first, second or third speed ratios for completion in the transmission or he may select an automatic range in which the initial drive is through the second speed ratio and automatic changes to third and fourth speed ratios subsequently take place as the speed of the vehicle increases or he may select still another automatic range in which the same automatic ratio changes take place except that a final automatic change is made into the fifth speed ratio.

It is also an object of the invention to provide improved mechanism for preventing excessive speeds of the vehicle engine and particularly for preventing a change from a higher to a lower speed ratio when the speed of the vehicle is so high that excessive engine speeds would result.

It is contemplated that the second speed ratio may be completed by either a friction engaging device or a one-way engaging device, and it is an object of the invention to so arrange the controls that when the second speed ratio is obtained at the option of the driver, exclusive of either of the automatic ranges, the friction device is utilized for completing the power train so that this is a two-way power train, while the one-way device is utilized for completing the power train in either of the automatic ranges.

It is another object of the invention to provide a plurality of shift valves, each of which causes a change in speed ratio through the transmission, and each of which is responsive to two governor pressures that are applied in accordance with changes in speed of the vehicle and the transmission driven shaft. It is contemplated that one of the governor pressures shall be effective for allowing an upshifting movement of the valve and that the other governor pressure is effective for holding the valve in an upshifted position once it is in this position, as long as the vehicle speed remains above a certain value. It is also an object of the invention to provide fluid flow restricting mechanism in connection with servomotors for transmission brakes and clutches, so that the brakes and clutches may be engaged to give smooth changes in drive under various vehicle operating conditions, and it is an object to provide one of the clutches with a Belleville type washer between the clutch engaging piston and the clutch plates which provides smooth changes of ratio with a minimum of valving.

The invention consists of the novel constructions, arrangements and devices to be hereinafter described and claimed for carrying out the above-stated objects and such other objects as will appear from the following description of preferred embodiments of the invention, illustrated with reference to the accompanying drawings, wherein:

Fig. 1 is a schematic diagram of a transmission with which our improved controls may be utilized;

Fig. 2 is a table showing the various clutches and brakes which may be engaged to complete various power trains through the transmission;

Fig. 3 is a diagram showing how Figs. 4, 5, 6, 7, 8 and 9 should be laid together in order to form a complete showing of the controls for the transmission illustrated in Fig. 1;

Figs. 4, 5, 6, 7, 8 and 9 are parts of the transmission control system of the invention which should be laid together in the manner shown in Fig. 3;

Fig. 8A is a portion of a modification of the transmission controls which can be substituted for Fig. 8 for showing the modification of the controls;

Fig. 10 is a longitudinal sectional view of a clutch forming a part of the modified controls; and Fig. 11 is a graph showing the engaging characteristics of the clutch illustrated in Fig. 10.

Like characters of reference designate like parts in the several views.

Referring now to Fig. 1 showing the transmission with which our improved controls are adapted to be utilized, the transmission comprises a drive shaft 20, a driven shaft 21, a pair of intermediate shafts 22 and 23 coaxially disposed with respect to the shafts 20 and 21, and sleeve shafts 24 and 25 respectively disposed over the shafts 22 and 23. The drive shaft 20 is adapted to be driven from the engine (not shown) of the vehicle in which the transmission is installed, and the driven shaft 21 is adapted to drive the road wheels (not shown) of the vehicle.

The transmission comprises, in general, a fluid coupling 26, planetary gear sets 27 and 28, a one-way brake 29, friction band brakes 30, 31 and 32, and friction disk type clutches 33 and 34.

The planetary gear set 27 comprises a sun gear 35, an elongated planet gear 36, a ring gear 37, a planet gear 38, a sun gear 39, and a carrier 40 for the planet gears 38 and 36. The planet gear 36 is in mesh with the sun gear 35 and with the ring gear 37, and the planet gear 38 is in mesh both with the planet gear 36 and with the sun gear 39. The sun gear 35 is connected with the shaft 22, and the carrier 40 is connected with the shaft 23.

The planetary gear set 28 is of the same type as the gear set 27 and comprises a sun gear 41, an elongated planet gear 42, a ring gear 43, a planet gear 44, a sun gear 45 and a carrier 46 for the planet gears 42 and 44. The planet gear 42 is in mesh with the sun gear 41 and with the ring gear 43, and the planet gear 44 is in mesh both with the sun gear 45 and with the planet gear 42. The sun gear 41 is connected with the shaft 23, and the carrier 46 is connected to the driven shaft 21 of the transmission.

The friction brake 30 comprises a friction drum 47 connected with the ring gear 37 and a friction band 48 adapted to be contracted to engage the drum 47. The drum 47 is connected to the one-way brake 29 which may be of any suitable construction and is shown to comprise a plurality of tiltable grippers 49 acting between an inner race 50 connected with the drum 47 and an outer race 51 connected with the casing 52 of the transmission and held stationary thereby. The one-way brake 29 functions so as to allow the drum 47 to rotate in the forward direction, that is, in the same direction as the drive shaft 20 of the transmission is driven from the vehicle engine, but prevents rotation of the drum 47 in the opposite direction.

The clutch 33 comprises a plurality of clutch disks 53 (see Fig. 7) connected with the shaft 24, a plurality of clutch disks 54 connected with the drum 47 and a movable piston 55 for pressing the plates 53 and 54 into frictional interengagement.

The brake 31 comprises a brake drum 56 connected with the sun gear 45 and engageable by a brake band 57. The clutch 34 comprises a plurality of friction plates 58 (see Fig. 7), a plurality of friction plates 59 and a piston 60. The plates 58 are connected with the drum 56, and the plates 59 are connected with the shaft 25. The piston 60 is adapted to move the plates 58 and 59 into frictional interengagement. The brake 32 comprises a drum 61 adapted to be engaged by a brake band 62. The ring gear 43 is fixed in the drum 61.

The fluid coupling 26 comprises an impeller 63 provided with a plurality of vanes 64 and connected to the shaft 20 and a turbine or a driven element 65 also provided with a plurality of vanes 66 arranged opposite the vanes 64 and connected with the shaft 22. The fluid coupling 26 is of conventional construction and hence need not be described in detail. The vanes 64 and 66 are disposed in the same fluid container, so that, when the impeller 63 is rotated, the vanes 64 of the impeller set up a toroidal fluid motion and transmit torque through the fluid to the turbine element 65. The shaft 24 is connected with the impeller 63 and is thus driven directly from the shaft 20.

The planet gear carrier 40 is provided with a ring gear 67, and a gear 68 is adapted to be shifted into mesh with the gear 67, so that the gear 68 may be driven for power take-off purposes.

A neutral condition of the transmisison is obtained when all of the brakes 30, 31 and 32 and the clutches 33 and 34 are disengaged (see Fig. 2). A neutral is also obtained if the brake 30 is engaged, with the remaining brakes and clutches just mentioned remaining disengaged. The brake 30 is actually in parallel with the one-way brake 29, which incidentally is always effective on the ring gear 37. With the one-way brake 29 being effective either with or without engagement of the friction brake 30, the carrier 40 is driven through the fluid coupling 26; however, since all of the brakes and clutches for the second planetary gearing 28 are disengaged, no power is transmitted to the driven shaft 21. Inasmuch as the carrier 40 is driven from the drive shaft 20, however, the ring gear 67 in conjunction with the shiftable gear 68 may be used for power take-off purposes. The one-way brake 29 functions to hold the ring gear 37 against reverse rotation, and the sun gear 35 is driven from the drive shaft 20, through the impeller 63, the runner 65, and the shaft 22. The sun gear 35 when thus driven causes rotation of the carrier 40 in the forward direction at a reduced speed with respect to that of the drive shaft 20. The friction brake 30 which is in parallel with the one-way brake 29 assures that the drive of the carrier 40 and ring gear 67 is a two-way drive instead of a one-way drive, in view of the fact that the one-way brake 29 may overrun.

Low or first speed forward drive may be obtained through the transmission by engaging the brake 32. The one-way brake 29 may be utilized for providing a drive through the first planetary gear set 27, and the brake 30 mal also be engaged, augmenting the action of the one-way brake 29, if desired. The planet gear carrier 40 is driven through the first planetary 27 and fluid coupling 26 as described above in connection with neutral condition of the transmission, and the carrier 40 drives the shaft 23 and the sun gear 41 of the second planetary gear set 28. The brake 32 functioning on the drum 61 causes the ring gear 43 to function as the reaction element of the second planetary gear set 28, and the drive proceeds through the planetary gearing 28 to the carrier 46 of the gear set 28 and the driven shaft 21.

Second speed forward drive through the transmission is obtained by disengaging the brake 32 and engaging the brake 31, either utilizing the one-way brake 29 for the first planetary gear set 27 alone or in conjunction with the brake 30. The planet gear carrier 40 of the first planetary gear set 27 is driven as before and rotates the sun gear 41 of the second planetary gear set 28. The brake 31 in this case causes the sun gear 45 to function as the reaction element of the planetary gear set 28, so that the carrier 46 in this case is driven at a higher speed than in low speed drive but at a reduction in speed with respect to that of the shaft 23. The driven shaft 21 rotates along with the carrier 46 at this increased speed.

Third speed forward drive is obtained by keeping the brake 31 engaged and engaging the clutch 34, allowing the brake 30 to disengage. The clutch 34 in this case functions actually as a brake, and the band 57 of the brake 31 is effective to brake the sun gear 45 of the second planetary gear set 28 as in second speed forward drive, and, through the clutch 34, the band 57 also brakes the sun gear 39 of the first planetary gear set 27. The two sun gears 45 and 39 now function as reaction elements in the planetary gear sets 27 and 28, respectively. The drive in this case is from the drive shaft 20 through the fluid coupling 26, the shaft 22, the sun gear 35, the planet gears 36 and 38, the carrier 40, the shaft 23, the sun gear 41, the planet gears 42 and 44 and the planet gear carrier 46 to the driven shaft 21. Since, for third speed drive, the sun gear 39 is held stationary instead of the ring gear 37, the shaft 23 in this case is driven at a higher speed than for the second speed forward drive, and in this case the one-way brake 29 overruns.

For fourth speed forward drive, the clutch 33 is engaged; the brake 31 remains engaged; and the clutch 34 is disengaged. The drive through the first planetary gear set 27 in this case is in two paths. One path is through the fluid coupling 26 and the shaft 22 to the sun gear 35, while the other path is through the impeller 26 to the shaft 24 and the clutch 33 to the ring gear 37. When there is substantial speed of the drive shaft 20, the sun gear 35 rotates substantially at the speed of the drive shaft 20, as there is little slip in the fluid coupling 26, and the clutch 33 connects the ring gear 37 directly with the drive shaft 20, so that the parts of the planetary gear set 27 all rotate substantially at a one to one ratio and drive the shaft 23 connected with the carrier 40 substantially at the speed of the drive shaft 20. The drive in fourth speed ratio through the planetary gear set 28 is the same as that in third speed ratio, since the same sun gear 45 is held stationary as the reaction element of the gear set 28.

For fifth speed forward drive, the brake 31 is disengaged and the clutch 34 is engaged, with the clutch 33 remaining engaged. The drive in this case through the first planetary gear set 27 is the same as in fourth speed forward drive, with all of the parts of the gear set 27 rotating at substantially the same speed as the drive shaft 20. In the case of fifth speed forward drive, however, two paths of power flow proceed from the first planetary gear set 27, one path being from the planet gear carrier 40 through the shaft 23 to the sun gear 41, and the other path being from the sun gear 39 through the sleeve shaft 25 and the clutch 34 to the sun gear 45. The drive proceeds through the planetary gears 44 and 42 of the planetary gear set 28 to the carrier 46 and the driven shaft 21, with the parts of the second planetary gear set 28 substantially all rotating at the same speed.

Reverse drive is obtained by engaging the clutch 34 and the brake 30. The brake 30 is effective on the ring gear 37, and the sun gear 35 is driven as before from the drive shaft 20 through the fluid coupling 26. The carrier 40 of the gear set 27 is driven at a reduced speed in the forward direction, as in certain previous drives, and drives the sun gear 41 through the shaft 23. The sun gear 39 of the first planetary gear set 27 under these conditions is driven at a faster speed than the carrier 40 but in the reverse direction, and this rotation is transmitted to the sun gear 45 of the second planetary gear set through the clutch 34. The resultant of the rotations of the sun gear 45 and the sun gear 41 is a rotation in the reverse direction of the planet gear carrier 46 of the second planetary gear set and a corresponding rotation of the driven shaft 21.

Since the brake 30 is the only reaction member in the transmission for reverse drive, the ring gear 37 tends to spin forwardly, and the freewheel unit 29 is not effective in restraining forward rotation. The brake 30 thus takes the complete reaction for the reverse drive. The brake 30, incidentally, is so arranged with respect to its apply piston effective on one end of the brake band 48 and a fixed reaction point on the other end of the band that the brake wraps or is self-energized for the reverse drive through the transmission and tends to unwrap or is de-energized for the forward drives for which the brake 30 is effective. This is so because the ring gear 37 tends to rotate in a counter-clockwise direction with regard to the brake 30 in its position shown in Figure 4 for reverse drive and in a clockwise direction with regard to the brake 30 in its position shown in Figure 4 for the forward speed drives for which the brake is effective.

It will be observed from a consideration of the various drives just mentioned that the carrier 40 is driven in the forward direction for all of the various drives, and thus the power take-off gear 68 may be utilized for all the drives, when in mesh with the gear 67, for power take-off purposes.

A person skilled in transmission design can be expected to be able to design a working transmission from the schematic showing of Fig. 1 as described above; however, for any details of design, if any are desired, the copending application of James A. Miller, Serial No. 429,268, filed May 12, 1954, may be referred to, this patent application showing the same transmission as has just been described. The ratios listed in Fig. 2, incidentally, are obtained from an actual embodiment of the transmission with gears of a certain size, and the gear sizes and ratios may be changed if desired, as is apparent.

The controls for the transmission comprise, in general, a front oil pump 75 driven from the drive shaft 20 of the transmission, a rear oil pump 76 driven from the driven shaft 21 of the transmission, a selector valve 77, a governor valve 78, a downshift inhibitor valve 79, a push start valve 80, a modulator valve 81, a pressure regulator valve 82, a coupling valve 83, a reverse interlock valve 84, a free wheel valve 85, a second speed valve 86, a third speed valve 87, a fourth speed valve 88, a fifth speed valve 89, a 5–4 shift valve 90, and a lubrication valve 91.

The pump 75 comprises a pump casing 92 having an oblong cavity 93 therein. A casing 94, also oblong in shape, is slidably disposed in the cavity 93. The casing 94 has a cylindrical cavity 95 therein, and a cylindrical rotor 96 is rotatably disposed in the cavity 95. The rotor 96 carries a plurality of vanes 97 slidably disposed in slots in the periphery of the rotor which contact the surface of the cylindrical cavity 95 on the ends of the vanes. The rotor 96 is driven from the drive shaft 20 of the transmission by any suitable means. A compression spring 98 is disposed between the lower end of the casing 94 and the bottom of a pocket 99 formed in the casing 92.

The casing 92 has an inlet chamber 100 in communication with the vanes 97 located on the same side of the casing as the chamber 100, and the casing 92 has an outlet chamber 101 in communication with the vanes 97 on the opposite side. An inlet conduit 102 is connected to the chamber 100, and outlet or line pressure supply conduits 103 and 104 are connected to the chamber 101. The cavity 93 has a conduit 105 connected to it at its upper end and has a conduit 106 connected to it at its lower end.

The pressure regulating valve 82 functions in conjunction with the pump 75 for causing the regulation of the output pressure of the pump 75 in the chamber 101 to predetermined values. The valve 82 comprises a casing portion 107 having ports 108, 109, 110, 111, 112 and 113, all opening into a cylindrical cavity 114 in the casing portion 107. A piston 115 is slidably disposed in the cavity 114 and is provided with an internal cavity 116 in communication with ports 117 extending through the valve piston. An annular groove 118 is provided about the piston 115.

A plug 119 is provided in the upper end of the cavity 114. The plug 119 is provided with ports 120 in communication with the port 112 and cylindrical connected cavities 121 and 122. The cavity 121 is in communication with the ports 120, and the cavity 122 receives a piston 123 having a stem 124 adapted to bear on the piston 115. A compression spring 125 extends between the plug 119 and the piston 115.

The port 108 is connected with the conduit 103; the port 109 is connected with the conduit 106; the port 110 is connected with the conduit 105; the port 112 is connected with a conduit 126; and the ports 111 and 113 are bleed ports which, like all other bleed ports in the transmission controls, are adapted to freely discharge into the oil sump 127.

The selector valve 77 comprises a casing portion 128 provided with ports 129, 130, 131, 132, 133, 134 and 135. The casing portion is provided with a cylindrical cavity 136 therein in which a piston 137 is slidably disposed. The piston 137 is formed with an annular groove 138 and annular indentations 139, 140, 141, 142, 143, 144 and 145. Detent balls 146 acted on by springs 147 are adapted to fit in the indentations 139, 140, 141, 142, 143, 144 and 145 for yieldably holding the piston 137 in its "D5," "D4," "3," "2," "1," "N" and "R" positions, which correspond to 5th speed automatic range, 4th speed automatic range, 3rd speed, 2nd speed, 1st speed, neutral, and reverse, respectively.

The port 129 is connected with the conduit 126; the port 130 is connected with the conduit 103; the port 131 is connected with a conduit 148; the port 132 is connected with a conduit 149; the port 133 is connected with a conduit 150; one of the ports 134 is connected with a conduit 151 and the other of the ports 134 is connected with a conduit 152; and the port 135 is connected with a conduit 153.

The coupling valve 83 comprises a casing portion 154 having ports 155, 156, 157, 158 and 159 therein. The casing portion is provided with a cylindrical cavity 160, and a piston 161 is slidably disposed in the cavity. The piston 161 has an annular groove 162 and is acted on by a spring 163 disposed between the piston 161 and a plug 164 fixed to close the lower end of the cavity 160. Both ports 155 and 156 are restricted; however, the port 156 is smaller in diameter than is the port 155, and both ports are connected to a conduit 165 constituting the inlet conduit for the fluid coupling 26. The port 157 is connected by means of branch conduit 166 with the conduit 126, and the port 158 is connected to the conduit 104. The port 159 is a bleed port.

The fluid coupling 26 has an outlet conduit 167 connected with a cooler 168. The cooler 168 comprises a water jacket 169 having a water inlet port 170 and a water outlet port 171. A cooling coil 172 is disposed in the water jacket 169 and is connected with the conduit 167. The coil 172 on its lower end is connected with an outlet 173 adapted to discharge into the sump 127.

A shunting conduit 174 connects the outlet 173 with the conduit 167, and a bypass valve 175 is provided in the conduit 174. The valve 175 comprises a ball 176 adapted to rest on a seat 177 and acted on and held on the seat by a compression spring 178. A bi-metallic strip 179 acts on the ball 176 and moves the ball 176 off its seat 177 against the action of the spring 178 when the oil in the conduit 167 is relatively cold.

The lubrication valve 91 comprises a casing portion 180 having ports 181, 182, 183, 184, 185 and 186 therein. The casing portion is provided with a cylindrical cavity 187 therein, and two hollow pistons 188 and 189 are slidably disposed in the cavity 187. A relatively strong compression spring 190 is disposed in the piston 188 and tends to move the piston 188 to the right, and a relatively weak compression spring 191 is disposed in the piston 189 and tends to move the piston 189 to the left. A stop 192 is provided extending between the ports 183 and 184 for limiting the movement of the pistons 188 and 189 due to the action of their respective springs 190 and 191.

The port 181 is a bleed port; the ports 182, 183 and 185 are all connected with a conduit 193 which is a lubrication conduit connected with various parts of the planetary gear sets 27 and 28 requiring lubrication; the port 184 is connected by means of a conduit 194 with the line pressure supply conduit 103; and the port 186 is connected by means of a branch conduit 195 with the conduit 126. It will be noted that the ports 183, 182 and 185 are relatively restricted in cross-sectional size. The port 183 is relatively small, and the port 185 is relatively large, although still restricted relative to the cross-sectional sizes of the conduits used in the transmission controls. The port 182 is intermediate in cross-sectional size between the ports 183 and 185, ports of these sizes being provided for purposes which will hereinafter be described.

The modulator valve 81 comprises a casing portion 196 having ports 197, 198 and 199 therein connected with a cylindrical cavity 200. A piston 201 is slidably disposed in the cavity 200 and is provided with a groove 202. The piston 201 is hollow on its upper end, and a compression spring 203 is disposed in the piston and acts between it and the upper end of the cavity 200. The port 197 is a bleed port; the port 198 is connected with a conduit 204; and the port 199 is connected to the conduit 103 by means of a branch conduit 205. A restricted passage 206 is connected between the two ports 198 and 199.

The modulator valve 81 is controlled by means of a vacuum motor 207 connected with the fuel intake manifold 208 of the vehicle engine. The motor 207 comprises a casing 209 having a flexible diaphragm 210 fixed at its periphery with respect to the casing 209 and movable therein and having a rigid piston 211 fixed thereto by means of which it acts on the valve piston 201. A compression spring 212 is provided in the housing 209 and acts on the piston 211, tending to move it and the valve piston 201 upwardly as seen in the drawing. The housing 209 is connected with the manifold 208, as shown, so that the vacuum in the manifold 208 is impressed on the lower side of the diaphragm 210.

The rear pump 76 is adapted at times to supply fluid under pressure to the conduit 204 through the push start valve 80. The rear pump 76 comprises a pump casing 213 having a fluid inlet cavity 214 and a fluid outlet cavity 215. A gear 216 is in mesh with a ring gear 217 which is rotatably disposed in the casing 213 and is eccentrically located with respect to the gear 216. A segmental casing portion 218 is disposed between the gears 216 and 217 and between the inlet and outlet cavities 214 and 215. The pump functions, when the gears 216 and 217 rotate in their illustrated direction to carry fluid between the gear teeth across the faces of the segmental casing portion 218 so as to transfer fluid from the inlet cavity 214 to the outlet cavity 215. The pump 76 is of conventional construction, and no further details of construction and operation are deemed necessary.

The inlet cavity 214 is connected by means of a conduit 219 with the sump 127, and the outlet cavity 215 is connected to a conduit 220. The conduit 220 is provided with a restricted bleed opening 221 for lubricating certain parts hereinafter to be described and also for relieving pressure within the outlet conduit 220 for purposes to be later mentioned. The gear 216 of the pump 76 is driven from the shaft 21 by any suitable driving mechanism.

The push start valve 80 comprises a casing portion 222 having ports 223, 224, 225, 226 and 227 therein. The casing portion 222 has an internal cylindrical cavity 228 in which a valve piston 229 is slidably disposed. The piston 229 is provided with a groove 230, and the piston is hollow on its lower end to receive a compression spring 231 acting between the lower end of the cavity 228 and the piston 229.

The port 223 is a bleed port; the port 224 is connected with a conduit 232; the port 225 is connected with the conduit 220; the port 226 is connected with the conduit 204; and the port 227 is connected by means of a branch conduit 233 with the conduit 103.

The downshift inhibitor valve 79 comprises a casing portion 234 having ports 235, 236, 237, 238, 239, 240, 241, 242, 243, 244, 245, 246 and 247. The casing portion is provided with a cylindrical cavity 248 therein, and a valve piston 249 is slidably disposed in the cavity 248. The piston 249 is provided with a peripheral groove 250 and is hollow at its right end to receive a compression spring 251 extending between the right end of the cavity 248 and the inner end of the hollow space in the piston 249.

The port 235 is connected with the conduit 232, and the port 236 is connected with the conduit 232 through a restriction 252. An inhibitor regulator screw 253 is adjustable toward and away from a seat 254 which is connected with the port 236 and more or less opens a bleed port 255 with respect to the port 236. The ports 237, 238 and 239 are restricted bleed ports, discharging into the sump 127. The port 240 is a bleed port but is relatively unrestricted. The port 241 is connected by means of a conduit 256 with the port 198 of the modulator valve 81 which functions as a port supplying line pressure, subject, however, transiently on initial increase, to the modulator valve 81, as will be described. The ports 242, 243, 244, 245 and 246 are respectively connected with conduits 257, 258, 259, 260 and 261. The port 247 is a bleed port.

The brake 30 is engaged by means of a hydraulic servomotor 262 which is also connected with the line pressure port 198 of the modulator valve 81, the connection being by means of a conduit 263. The servomotor 262 comprises a piston 264 slidably disposed in a cylindrical cavity 265 provided in a housing 266. A compression spring 267 is disposed between an end of the housing 266 tending to move the piston 264 to the left. The piston 264 is provided with a piston rod 268 slidably extending through the housing 266, and the piston rod 268 is connected by means of a strut 269 with one end of the brake band 48, resting in a slot 270 provided in the end of the band. The other end of the band 48 is held by an anchor pin 271 fixed with respect to the casing 52 of the transmission, a strut 272 extending between the pin 271 and a notch 270a provided in the other end of the band 48. A compression spring 273 is provided between outwardly extending flange portions 274 of the band 48 for yieldably holding the band disengaged with respect to its drum.

The housing 266 has brake apply chamber 266a on the left side of the piston 264 and a brake disapply chamber 266b on the right side of the piston 264. The housing is provided with a port 275 connected with the conduit 263 by means of which fluid under pressure may be supplied to the chamber 266a, and the housing 266 is provided with a port 276 connected with a conduit 277 by means of which fluid under pressure may be supplied to the chamber 266b for assisting the springs 267 and 273 to disapply the band 48 with respect to its drum.

A bypass valve 278 (for details of construction see Figure 7) is provided for at times hydraulically connecting the chambers 266a and 266b. The valve 278 comprises a piston 279 slidably disposed in a cylindrical cavity 280 provided in the housing 266 and connected on one end with the chamber 266b and on the other end with the chamber 266a. The piston 279 is hollow, and a compression spring 281 is provided in the piston 279 and acts between the piston and a part of the housing 266, tending to move the piston 279 to the left. The piston 279 is provided with a port 282 therethrough which, when the piston is in its extreme left position, connects the chamber 266a with the chamber 266b.

The brakes 31 and 32 each have similar brake applying and disapplying mechanism including a servomotor 262. For purposes of differentiation, the servomotor for the brake 32 is designated as 262A and its two ports as 275A and 276A, and the servomotor for the brake 31 is designated as 262B and its ports as 275B and 276B.

The reverse interlock valve 84 is connected with the line pressure supply port 198 of the modulator valve 81 by means of a conduit 283. The reverse interlock valve comprises a casing portion 284 having ports 285, 286, 287, 288 and 289. The casing portion has a cylindrical cavity 290, and a valve piston 291 is slidably disposed therein. The piston 291 has a peripheral groove 292 and is hollow on one end to receive a compression spring 293 which acts between the piston and the right end of the cavity 290 to urge the piston 291 to the left.

The port 285 is connected by means of a branch conduit 294 with the conduit 126; the port 286 is connected to a conduit 295; the port 287 is connected to a conduit 296; the port 288 is connected to the conduit 283; and the port 289 is connected to the conduit 257.

The freewheel valve 85 is also connected to the line pressure supply port 198 of the modulator valve 81, the connection being by means of the conduit 263 and a conduit 297. The freewheel valve comprises a casing portion 298 having a plurality of ports 299, 300, 301, 302 and 303. The casing portion has a cylindrical cavity 304 therein and a piston 305 is slidably disposed in the cavity 304. The piston is provided with a peripheral groove 306, and the piston is hollow on one end for receiving a compression spring 307 which urges the piston 305 to the limit of its movement to the left.

The port 299 is connected to a conduit 308; the port 300 is connected to a conduit 309; the port 301 is connected to the conduit 277; the port 302 is connected to the conduit 297; and the port 303 is a bleed port.

The governor valve 78 is connected to the conduit 151 which in turn is connected to the selector valve 77. The governor valve 78 comprises a casing portion 310 having ports 311, 312, 313, 314, 315, 316 and 317 therein. The casing portion 310 is provided with a cylindrical cavity 318 therein in which a piston 319 is slidably disposed. The valve piston 319 is provided with peripheral grooves 320 and 321, and the groove 321 is connected by means of a port 322 and a passage 323 with one end of the piston 319. The port 311 is connected with a conduit 324; the port 312 is connected with a conduit 325; the port 313 is connected with a conduit 326; and the port 314 is connected to the conduit 151.

The valve piston 319 is moved by means of a speed responsive governor 327 which comprises a pair of flyweight 328 each connected by links 329 between an arm 330 integral with the piston 319 and a movable part 331. A compression spring 332 is disposed between the arm 330 and the part 331. As will be apparent, the weights 328 through the links 329 pull the piston 319 toward the part 331 against the action of the spring 332 as the velocity of the weights 328 increases. The part 331 may be moved along the axis of rotation of the weights 328 by means of the vehicle accelerator 333. The accelerator is connected by means of a link 334 with a bell crank 335 which is connected by means of a link 336 with the part 331. As an analysis of the linkage connecting the accelerator 333 and the part 331 will indicate, when the accelerator 333 is moved downwardly in a throttle opening direction, it will cause movement of the part 331 toward the part 330 and thus tend to move the part 330 and the valve piston 319 to the left, assuming that the weights 328 remain away from their axis of rotation the same amount with no change in speed of the weights. The weights 328 are driven from the driven shaft 21 by any suitable mechanism, so that they are in effect, along with the spring 332, a governor responsive to the speed of rotation of the shaft 21.

Three needle pistons 337, 338 and 339 are slidably disposed in the casing portion 310 and are adapted to contact and be effective on the arm 330. The pistons 337, 338 and 339 are respectively in communication with the ports 315, 316 and 317, so that fluid pressure in these ports is effective to move the pistons into contact with the part 330.

The second speed valve 86 is connected with the downshift inhibitor valve 79 by means of the conduit 258 and is connected with the line pressure supply port 198 of the modulator valve 81 by means of the conduit 263 and a conduit 340. The second speed valve 86 comprises a casing portion 341 having ports 342, 343, 344, 345, 346, 347, 348, 349 and 350 therein. The casing portion 341 has a cylindrical cavity 351 therein, and valve pistons 352 and 353 are slidably disposed in the cavity 351. The piston 352 is in the form of a simple plug, and the piston 353 is provided with a pair of separated grooves 354 and 355. The piston 353 is hollow on one end to receive a compression spring 356 which acts to move the valve piston 353 to the left.

The ports 342 and 248 are connected by means of a conduit 357; the port 343 is connected to the conduit 149; the port 344 is a bleed port; the port 345 is connected by means of a conduit 358 with the port 276A of the servomotor 262A and by means of a conduit 359 also with the port 275B of the servomotor 262B; the port 346 is connected with the conduit 340; the port 347 is a bleed port; the port 349 is connected to the conduit 258; and the port 350 is a bleed port.

The fourth speed valve 88 is connected with the downshift inhibitor valve 79 by means of the conduit 260, with the governor valve by means of the conduit 325, and with the line pressure supply port 198 of the modulator valve 81 by means of the conduit 263 and a conduit 360. The valve 88 comprises a casing portion 361 provided with ports 362, 363, 364, 365, 366, 367, 368, 369, 370, 371, 372 and 373. The casing portion is provided with a cylindrical cavity 374, and pistons 375 and 376 are slidably disposed in the cavity 374. The piston 375 is simply a plug, and the piston 376 is relatively elongated and is provided with grooves 377, 378 and 379. The piston 376 is hollow on one end to receive a compression spring 380 which tends to move the piston 376 to the limit of its movement to the left.

The ports 362 and 371 are connected by means of a conduit 381; one of the ports 363 is connected with the conduit 152 and the other port 363 is connected with the conduit 308; the port 364 is connected with the conduit 296; the port 365 is connected with a conduit 382 and thereby with the clutch piston 69 of the clutch 34; one port 366 is connected with a conduit 383 and the other port 366 is connected with conduits 384 and 385; the port 367 is a bleed port which is relatively restricted in cross-sectional size; one of the ports 368 is connected with a conduit 386 and the other of the ports 368 is connected by means of a conduit 387 with the clutch piston 55 of the clutch 33; the port 369 is connected with the conduit 360; the port 370 is a bleed port; the port 372 is connected with the conduit 260; and the port 373 is connected with the conduit 325.

A jet valve 388 is provided in the conduit 385 which is connected to the port 276B of the servomotor 262B.

The jet valve comprises a restriction 389 in the conduit 385 and a conduit 390 in parallel with the restriction. A ball check valve is in the conduit 390 and comprises a ball 391 adapted to rest on a seat 392.

The fluid under pressure within the conduits 382 and 387 is respectively applied to the pistons 60 and 55 for the clutches 34 and 33, and ball check valves are provided in connection with the pistons which close on fluid pressure application. The check valve for each of the clutches comprises a ball 393 adapted to rest on a seat 394 and thereby close an opening 395 which may drain the fluid pressure from behind the pistons 60 and 55. The ball 393 will close the passage 395 when pressure is applied to the respective pistons 60 or 55; however, after fluid pressure is released from the piston, the ball will move off its seat 394 and permit the substantially complete draining of the chamber behind the piston, so that fluid pressure cannot build up in the chamber due to centrifugal force.

The fifth speed valve 89 is connected with the downshift inhibitor valve 79 by means of the conduit 261, with the governor valve 78 by means of the conduit 326 and with the line pressure supply port 198 of the modulator valve 81 by means of the conduit 263 and a conduit 396. The fifth speed valve comprises a casing portion 397 having ports 398, 399, 400, 401, 402, 403, 404, 405 and 406. The casing portion 397 is provided with a cylindrical cavity 407, and valve pistons 408 and 409 are slidably disposed in the cavity 407. The piston 408 is simply a slidable plug, and the piston 409 is relatively elongated and has peripheral grooves 410 and 411. The piston 409 is hollow on one end to receive a compression spring 412 which functions to yieldably hold the piston 409 to the limit of its movement to the left.

The port 398 is connected by means of a conduit 413 with the port 404; the port 399 is connected to the conduit 153; the port 400 is connected to a conduit 414; the port 401 is connected to the conduit 384; the port 402 is connected to the conduit 396; the port 403 is a bleed port; the port 405 is connected to the conduit 261; and the port 406 is connected to the conduit 326.

The 5–4 shift valve 90 comprises a casing portion 415 provided with ports 416, 417, 418, 419, 420, 421, 422 and 423. The casing portion 415 is provided with a cylindrical cavity 424 in which valve pistons 425 and 426 are slidably disposed. The piston 425 is simply a plug, and the piston 426 is relatively elongated and is provided with a pair of peripheral grooves 427 and 428. The piston 426 is hollow on one end to receive a compression spring 429 which holds the piston 426 yieldably to the limit of its movement to the left.

The port 416 is connected with the conduit 383; the port 417 is connected by means of a conduit 430 with the port 421; the port 418 is connected with the conduit 414; the port 419 is a restricted bleed port connected at all times with the port 418; the port 420 is an unrestricted bleed port; the port 422 is connected with the conduit 386; and the port 423 is an unrestricted bleed port.

The third speed valve 87, like the valves 88 and 89, is connected to the downshift inhibitor valve, the governor valve and the line pressure supply port 198 of the modulator valve 81. The connection to the governor valve is by means of the conduit 324; the connection to the downshift inhibitor valve is by means of a conduit 259; and the connection to the port 198 of the valve 81 is by means of a conduit 431 and the conduit 263. The valve 87 comprises a casing portion 432 having ports 433, 434, 435, 436, 437, 438, 439, 440, 441 and 442. The casing portion 432 is provided with a cylindrical cavity 443, and valve pistons 444 and 445 are slidably disposed in the cavity 443. The piston 444 simply constitutes a plug, and the piston 445 is relatively elongated and is provided with peripheral grooves 446 and 447. The piston 445 is hollow on one end to receive a compression spring 448 which urges the piston 445 to the limit of its movement to the left.

The port 433 is connected to the port 440 by means of a conduit 449; the port 434 is connected to the conduit 150; the port 435 is a bleed port; the port 436 is connected to the conduit 309; the port 437 is connected to the conduit 295; the port 438 is connected to the conduit 431; the port 439 is a bleed port; the port 441 is connected to the conduit 259; and the port 442 is connected to the conduit 324.

A modulator valve 450 is disposed in the conduit 295 and comprises a casing portion 451 in which a hollow cartridge 452 is slidably disposed. The cartridge on one end is provided with an opening 453 therethrough, and a ball 454 is adapted to rest on a seat 455 and close the opening 453. A spring 456 is provided in the cartridge 452 and holds the ball 454 yieldably on its seat 455. The cartridge 452 is also provided with side openings 457 therethrough which are closed at times by the casing portion 451 depending on the position of the cartridge 452 in the casing portion 451. As will be observed, one end of the casing portion 451 is connected with the port 437 of the third speed valve 87, and the other end is connected with the port 286 of the reverse interlock valve 84.

In operation, the setting of the selector valve 77 determines the speed ratio that exists in the transmission. When the piston 137 of this valve is in its "R," "1," "2" or "3" positions; reverse drive, low gear drive, second gear drive, or third gear drive are provided by the transmission exclusive of any of the other drives. When the piston 137 is in its "N" position, the transmission is in neutral. When the piston 137 is in its "D4" position, the controls are in one of their automatic ranges in which the transmission starts in second speed, changes to third speed and finally changes to fourth speed. When the piston 137 is in its "D5" position, the transmission automatically starts in second speed, changes to third speed, thereafter changes to fourth speed, and finally changes to fifth speed.

When the piston 137 is in its "N" position, fluid under pressure exists in the groove 138 and port 130 of the selector valve, but the groove 138 is out of communication with the other ports. Line pressure also exists in the port 198 of the modulator valve 81, and this line pressure is supplied through conduit 256 to the inhibitor valve 79, through conduit 396 to the fifth speed valve 89, through conduit 360 to the fourth speed valve 88, through conduit 340 to the second speed valve 86, through conduit 297 to the freewheel valve 85 and through conduit 431 to the third speed valve 87; however, each of these valves in this condition of the controls simply blocks this line pressure, and it is of no effect.

The port 198 of the modulator valve 81 is also connected by means of the conduit 263 with the port 275 of the servomotor 262 for the brake 30, and line pressure is supplied to the cavity 266a of the servomotor 262 and moves the piston 264 against the springs 267 and 273 to engage the brake 30. A power train is thus completed through the first planetary gear set 27; however, since none of the friction elements of the second planetary gear set 28 is engaged, the transmission is as a whole in neutral, and the driven shaft 21 is not driven. The ring gear 67 connected with the carrier 40 of the first planetary gear set 27 is, however, driven, so that power may be derived from the power take-off gear 68 movable into mesh with the gear 67. The valve 278 in the servomotor 262 under these conditions is closed. The pressure in the cavity 266a moves the piston 279 against the action of the spring 281 so as to close the port 282 in the piston 279 by means of the walls of the surrounding cavity 280, and pressure thus cannot leak through the valve 278 to the cavity 266b in the servomotor 262.

The line pressure applied to the selector valve 77 and that existing in the port 198 of the modulator valve 81 is derived from the front pump 75 driven by the drive shaft 20 of the transmission. The rotor 96 of the pump 75 is driven by the drive shaft in the illustrated direction, and the vanes 97 in contact with the cylindrical cavity 95 function to draw fluid from the inlet cavity 100 in the pump casing 92 and discharge it into the outlet cavity 101 in the casing 92. Fluid is pumped by the pump 75 through the conduit 102 from the sump 127, and fluid output from the pump is present in conduits 103 and 104. The conduit 103 is connected with the selector valve 77 for supplying line pressure thereto, and the port 198 is connected through the restriction 206 and branch conduit 205 with the line pressure supply conduit 103, so that line pressure exists in the port 198. The modulator valve 81 functions to bypass at times the restriction 206 to connect the conduits 103 and 205 with the port 198. The diaphragm 210 of the vacuum motor 207 for controlling the valve piston 201 of the modulator valve 81 has the vacuum of the manifold 208 of the vehicle engine applied thereto, and thus when there is little torque demand and the vehicle accelerator 333 is released, there is a relatively high vacuum, and the piston 201 is moved downwardly due to the action of the spring 203 to block the port 198 with respect to the port 199 and branch conduit 205. The high vacuum is effective on the diaphragm 210 drawing the diaphragm 210 and the piston 211 downwardly against the action of the spring 212, allowing such action of the spring 203 moving the piston 201 downwardly; conversely, when the vacuum in the manifold 208 is low, as when there is relatively large torque demand by the vehicle operator and the engine throttle is open, the spring 212 in this case is effective through the piston 211 to move the valve piston 201 upwardly against the action of the spring 203 to connect the ports 199 and 198 through the groove 202. When the restriction 206 is effective, as when the accelerator is released, it impedes the flow of fluid from the branch conduit 205 to the port 198 so as to impede the flow of fluid to any of the parts which may be connected with the port 198, but when the vacuum is relatively low with an opening of the vehicle throttle, there is no such impedance to fluid flow, and fluid pressure is applied instantaneously to any of the parts that may be connected with the port 198. In either case, the pressure in port 198 rises to full line pressure that exists in conduit 103 when the fluid flow through the restriction 206 ceases.

The pressure regulator valve 82 functions to regulate the pressure output of the pump 75 to a predetermined value, such as 80 lbs. p.s.i. Initially, the valve piston 115 is at the limit of its movement downwardly under the action of the spring 125 so that its ports 117 are in communication with the port 109, and any fluid pressure from the pump 75 is transmitted to the lower part of the cavity 93 in the pump housing 92, augmenting the action of the spring 98 in holding the pump casing 94 in its illustrated position in which there is maximum eccentricity between the casing 94 and the rotor 96 and a consequent maximum pumping action. As the pressure in the conduit 103 increases, it is effective against the piston 115 to move the piston upwardly against the action of the spring 125 to connect the ports 117 with the port 110 and supply fluid under pressure from the conduit 103 through the conduit 105 to the upper end of the cavity 93 in the pump casing 92. At the same time, the conduit 106 and port 109 are connected through the groove 118 with bleed port 113 to relieve the fluid beneath the pump casing 94. The fluid under pressure in the conduit 105 acts on the upper surface of the pump casing 94 and moves it downwardly against the action of the spring 98 to thereby reduce the eccentricity between the rotor 96 and the cylindrical cavity 95 and reduce pumping action by the pump 75. As pressure in the conduit 103 reduces for any reason, the valve piston 115 moves downwardly to connect the ports 117 with the port 109 while if the pressure in the conduit 103 tends to become too great, the piston 115 moves in the opposite direction connecting, as has just been described, the ports 117 with the port 110, for supplying fluid under pressure either to the bottom or the top of the cavity 93 respectively. The net result of the action of the piston 115 is to cause the pressure in the conduit 103 to remain substantially the same at a preselected line pressure, for example 80 lbs. p.s.i.

Line pressure in the conduit 103 is transmitted through the branch conduit 233 to the upper end of the piston 229 of the push start valve 80. The piston 229 is thus moved downwardly against the action of the spring 231, so that the port 226 and the conduit 204 are blocked by the piston 229. The groove 230 of the piston 229 under these conditions connects the ports 225 and 224 for purposes hereinafter to be described.

Fluid is supplied to the fluid coupling 26 in neutral and all forward drives through the two restricted ports 155 and 156. The piston 161 of the valve 83 is in its uppermost position, due to the action of the spring 163, and the groove 162 of the piston 161 connects the ports 158, 155 and 156. Fluid flows from the conduit 104 connected with the output cavity 101 of the pump 75, through the valve 83 and its restricted ports 155 and 156 to the inlet conduit 165 of the fluid coupling 26. Fluid flows out of the coupling 26 through the conduit 167 and through the coil 172 in the oil cooler 168 to the outlet 173 and from thence into the sump 127. Cooling water is made to flow through the housing 169 of the cooler from the port 170 to the port 171, and the oil flowing through the coil 172 is thus cooled. The ball 176 of the bypass valve under cold oil conditions is off its seat 177 and allows oil from the conduit 167 to bypass the cooler 169 through the bypass conduit 174. The bimetallic thermostatic element 179 under cold oil conditions acts against the ball 176 and moves it off its seat 177 against the action of the spring 178 in order to secure this result. Upon subsequent heating of the oil, the end of the bimetallic thermostatic element 179 moves upwardly allowing the ball 176 to move on its seat 177 and block the conduit 174.

The lubrication valve 91 provides a connection between the ports 184 and 183 when both of the pistons 188 and 189 are at the limits of their movement against the stop 192 under the action of the springs 190 and 190. The port 183 is relatively restricted and provides a minimum flow of lubricating fluid to the gear sets 27 and 28 under idling conditions of the vehicle engine, when the line pressure in the conduit 103 and connected conduit 194 is substantially less than the pressure ordinarily maintained by the pressure regulating valve 82. When the pressure in the conduits 103 and 194 rises to that line pressure maintained by the valve 82, for example, 80 lbs. p.s.i., this pressure exerted on the left end of the valve piston 189 moves the valve piston to the right against the action of its spring 191 and opens the relatively large port 185 with respect to the port 184 and provides a greater flow of lubricating fluid. The piston 188 does not move at this time but requires a much higher line pressure to move, such as a pressure of 160 lbs. p.s.i. which is used for reverse drive, as will hereinafter be described.

The piston 137 of the selector valve 77 is moved into its "1" or low speed position in order to obtain low speed drive through the transmission. With the piston 137 allowed to remain in its "1" position, the low speed drive through the transmission remains without change. The piston 137, when in its "1" position, connects the ports 130 and 131 by means of its groove 138, and fluid pressure is thus supplied from the line pressure conduit 103 to the conduit 148 and the servomotor 262A, and particularly the apply cavity 266a of this servomotor. The brake 32 is thus applied, and the brake 30 remains applied since its servomotor 262 remains connected to the port 198 of the modulator valve 81. With both of the brakes 30 and 32 applied, the low speed ratio is completed through the transmission.

As the vehicle speed increases, the driven shaft pump 76 begins to pump fluid into the conduit 220. The push-start valve piston 229, as at all times when the front pump 75 is producing fluid under pressure, is at its lowermost position connecting the ports 225 and 224 by means of its groove 230, and the fluid pressure from the line 220 is supplied to the conduit 232 and to the left end of the downshift inhibitor valve 79. As the vehicle speed increases in first speed ratio, the pressure output of the driven shaft pump 76 increases and finally moves the piston 249 of the valve 79 to the right against the action of the spring 251. Prior to such movement, the fluid output of the pump 76 escapes through the restricted orifice 221, and also through the restricted orifice 252 and the restriction formed by the inhibitor regulator screw 253. Due to these relief openings, the pressure in the conduits 220 and 232 increases approximately coordinately with the speed of the driven shaft 21. As the valve piston 249 moves farther in low speed ratio, it uncovers the port 236 which shunts the restriction 252, and this opening of the port 236 temporarily decreases the fluid pressure output of the pump 76 and prevents the valve piston 249 from moving farther at this time. The speeds of the vehicle engine and thereby the vehicle in first speed ratio are, of course, limited, and the valve piston 249 can only go to its position uncovering the port 236 in this speed ratio. The screw 253 is adjustable with respect to its seat 254 to allow the response of the piston 249 to be adjusted for different capacities of different pumps 76. The restricted bleed orifice 221 may be allowed to discharge directly into the sump 127 but is preferably used for lubricating moving parts of the transmission, such as, for example, a gear drive for driving the governor 327 from the driven shaft 21.

The piston 249 in moving to uncover the port 236 connects the port 242 with the port 241. The port 241 is connected by means of the conduit 256 with the line pressure supply port 198 of the modulator valve 81, and line pressure is thus supplied to the reverse interlock valve 84 through the conduit 257 connected to the port 242. Line pressure is thus applied on the right end of the piston 291 of the reverse interlock valve for purposes which will be described hereinafter in connection with reverse drive.

The transmission is changed from first speed ratio to second speed ratio by moving the selector valve piston 137 into its "2" position, and with the piston 137 remaining in this position, the transmission will remain in second speed ratio. When the piston 137 is in its "2" position, its groove 138 connects the ports 130, 131 and 132. The port 131 supplies line pressure as in first speed ratio, to the cavity 266a of the servomotor 262A. The port 132 through the conduit 149 supplies lines pressure to the port 343 of the second speed valve 86, and the piston 353 of the valve 86 is moved to the right against the action of its spring 356, so as to connect the ports 345 and 346 by means of the groove 354 in the piston 353 and to connect the ports 348 and 349 by means of the piston groove 355. The port 346 is connected by means of the conduit 340 and the conduit 263 with the line pressure supply port 198 of the modulator valve 81, and the line pressure is supplied through the conduit 340, the port 346, the groove 354, the port 345, the conduit 358 and the port 276a to the disapply cavity 266b of the servomotor 262A for the brake 32. The brake apply cavity 266a of the brake servomotor 262B is connected by means of the conduit 359 with the conduit 358, and line pressure is simultaneously applied within this cavity so as to move the piston 264 of the servomotor 262B in the engaging direction to engage the brake 31. The fluid pressure in the cavity 266b of the servomotor 262A is effective to disengage the brake 32, since the line pressure in this cavity 266b balances that in the opposing cavity 266a, and the springs 267 and 273 for the brake 32 are effective to disengage the brake. When the brake 31 is engaged and the brake 32 is disengaged, with the brake 30 allowed to remain engaged, the transmission is in second speed forward drive.

As has been noted, the port 346 of the second speed valve 86 through which pressure is applied to the apply side of the piston 264 of the servomotor 262B for the brake 31 is connected with the line pressure supply port 198 of the modulator valve 81 instead of directly with the line pressure supply conduit 103, and the application of line pressure to the servomotor 262B for engaging the brake 31 is thus under the control of the modulator valve 81. Assuming that the selector valve piston 137 is moved from its "1" to its "2" position when the accelerator 333 is released in a closed throttle position, in this case the vacuum motor 207 is effective, due to the high vacuum then present in the manifold 208, to allow the spring 203 effective on the piston 201 of the modulator valve 81 to move the piston 201 into position closing the port 198 with respect to the port 199. Under these conditions, the flow of fluid pressure to the port 346 of the second speed valve 86 is restricted by the restriction 206 associated with the modulator valve 81, and the fluid pressure in the apply cavity 266a of the servomotor 262B builds up slowly due to the restriction 206, and the completion of the second speed power train takes place relatively slowly so that an undesirable jerk upon completion of this power train by engagement of the brake 31 does not take place. If the selector valve piston 137 is moved from its "1" to its "2" position when the vehicle engine is transmitting substantial torque with the accelerator depressed, the vacuum in the manifold 208 will be relatively low, and the spring 212 in the vacuum motor 207 will move the valve piston 201 of the modulator valve 81 upwardly so as to connect the ports 199 and 198 through the groove 202 of the piston 201. Under these conditions, there will be no such restricted flow of fluid pressure to the port 346 of the second speed valve 86, and a relatively rapid engagement of the brake 31 will take place. Since the torque output of the vehicle engine at this time is relatively high, a relatively rapid engagement of the brake 31 may take place without an undesirable lurch of the vehicle. It will be noted that the disapply cavity 266b of the servomotor 262A for the brake 32 is connected in parallel with the supply cavity 266a of the servomotor 262B for the brake 31 so that the disengaging action of the brake 32 is coextensive with the engaging action of the brake 31, and the brake 32 will disengage either fast or slow coextensively with a fast or slow engagement of the brake 31 in making this change of drive.

Various fluid leakages may be expected to occur in a fluid system of the type illustrated and described. Due to these leakages, it can be expected that perhaps the line pressure in the disapply cavity 266b is less than the line pressure in the apply cavity 266a of the servomotor 262A for the brake 32 when second speed drive is completed. In order to prevent drag of the brake band 62 on its drum 61 due to such a differential in pressure, we have provided the valve 278 in the servomotor 262A. The valve 278 operates, when there is a relatively small differential of pressure in the cavities 266b and 266a, to open and connect the cavities 266a and 266b and assure that no such differential of pressure exists. When the pressure in the disapply cavity 266b is within this small differential of pressure with respect to the pressure in the cavity 266a, the pressure in the cavity 266b is effective on the right side of the valve piston 279 and augments the action of the spring 281 in moving the valve piston 279 to the limit of its movement to the left so as to open the port 282 in the piston 279 with respect to the cavity 266a and thereby connect the cavities 266a and 266b. The valves 278 in the other servomotors 262 and 262B, incidentally, operate in the same manner to connect the disapply cavities 266b and the apply cavities 266a in the respective servomotors when there is a small differential in pressure existing in the two cavities. In an actual embodiment, this small differential of pressure may be on the order of 12 lbs. p.s.i.

The speed of the transmission driven shaft 21 and of the vehicle in second speed drive may become sufficient so that the pressure in the conduits 220 and 232 from the driven shaft pump 76 may be sufficiently high to move the valve piston 249 of the downshift inhibitor valve 79 one step farther to the right to vent the restricted port 237 with respect to the port 235 and to connect the port 243 with the port 241 by means of the groove 250 in the piston 249. The port 241 is supplied with line pressure from the port 198 of the modulator valve 81, and the port 243 supplies line pressure through the conduit 258 to th eport 349 of the second speed valve 86. When the piston 353 of the second speed valve 86 is at its extreme right hand position as for second speed drive just described, its groove 355 connects the ports 349 and 348 and supplies line pressure through the conduit 357 to the port 342, and line pressure is thus applied on the left end of the plug 352. The plug 352 is effective to hold the piston 353 at the limit of its movement to the right, even if the selector valve piston 137 is moved back from its "2" position to its "1" position to drain the conduit 149 and connected port 343 of the second speed valve 86. Thus line pressure continues to exist in the conduits 358 and 359 for maintaining the transmission in second speed ratio even though the selector valve piston is moved back, assuming that the speed of the vehicle has become sufficient to move the downshift inhibitor valve piston 249 into its position in which its groove 250 connects the port 243 with the sport 241. Excessive increases in vehicle engine speed are thus avoided.

The transmission is changed from second speed ratio to third speed ratio by moving the selector valve piston 137 from its "2" to its "3" position, and in the latter position of the selector valve, no upshifts from third speed ratio can take place in the transmission. The selector valve piston 137 in its "3" position connects the ports 130, 131, 132 and 133 by means of its groove 138. Fluid pressure supplied to the ports 131 and 132 has the same effect as for the second speed drive just described, and the fluid pressure supplied to the port 133 is effective for causing the shift from second speed ratio to third speed ratio in the transmission. Fluid pressure supplied to the port 133 flows through the connected conduit 150 to the port 434 of the third speed valve 87 and moves the piston 445 to the limit of its movement to the right against the action of its spring 448. The valve piston 445 in this position connects the ports 440 and 441 by means of the groove 447. The valve piston 445 in this shifted position also connects the ports 436, 437 and 438. The port 438 is supplied with line pressure from the port 198 of the modulator valve 81, and fluid pressure is thus supplied to both ports 436 and 437. The line pressure in port 436 flows through the conduit 309 to the port 300 of the freewheel valve 85 and thence through the groove 306, port 301, conduit 277, and port 276 of the servomotor 262 to the disapply cavity 266b of the servomotor 262. Line pressure in this cavity causes the disengagement of the brake 30. The line pressure supplied to the port 437 flows through the conduit 295, valve 450, the port 286, groove 292, port 287, conduit 296, the port 364 of the fourth speed valve 88, port 365, conduit 382 to the piston 60 of the clutch 34, thus applying the clutch. Since the supply port 438 of the third speed valve 87 is connected to the port 198 of the modulator valve 81, the engagement of the clutch 34 and the disengagement of the brake 30 is relatively protracted for released accelerator position and relatively quick for depressed accelerator position, due to the action of the modulator valve 81, as was described in connection with the change from first to second speed drive. In addition, the valve 450 provides a modulating influence on engagement of the clutch 34. The fluid flow to the clutch piston 60 takes place through the orifice 453 and moves the ball 454 off its seat 455. The cartridge 452 is moved to the limit of its movement downwardly so that the openings 457 in the cartridge are closed, and all fluid flow must take place through the orifice 453.

During the engagement period for the clutch 34, the valve 450 acts as a pressure reducing valve. The line pressure in the conduit 295 between the port 437 and valve 450 acts against the ball 454; and this force, after fluid flows through the orifice 453, is balanced by the spring 456 and a reduced clutch engaging pressure in the conduit 295 between the valve 450 and the port 286.

During third speed drive, the transmission driven shaft 21 and the vehicle may be driven at sufficient speeds so that the downshift inhibitor valve piston 249 is moved still another step to the right against the action of its spring 251, opening another restricted orifice 238 to the pump 76. The valve piston 249 at this time connects the port 244 in addition to the ports 243 and 242 with the line pressure supply port 241, and line pressure is supplied through the port 244 and connected conduit 259 to the port 441 of the third speed valve 87. When the valve piston 445 of the third speed valve has been shifted over to the limit of its movement to the right, it connects the port 441 by means of its groove 447 with the port 440 and thereby with the port 433 by means of the conduit 449. Line pressure is thus applied on the left end of the plug 44, and even though the selector valve piston 137 may be shifted back to a lower speed position, draining the conduit 150, pressure in which initially moved the piston 445 to the right; nevertheless, the piston 445 remains in its third speed position, and third speed drive remains effective. As will be recognized, this action of the downshift inhibitor valve 79 on the third speed valve is similar to its action on the second speed valve 86, maintaining each valve in its shifted position, once shifting has taken place, so that the speed ratio through the transmission will not be reduced once a high speed of the vehicle has been attained at the high speed ratio, preventing excessive vehicle engine speed.

The selector valve piston 137 when moved another notch to the right is in its "D4" position and so controls the transmission that the transmission starts in second speed ratio and changes automatically to third speed ratio and finally changes automatically into fourth speed ratio which is the highest ratio available in this range. The piston 137 in its "D4" position connects the ports 130, 131, 132, 133 and 134 together by means of the groove 138. Line pressure is thus supplied through a port 134 to the conduit 151. The governor valve piston 319 is initially in its position connecting the ports 311, 312, 313 and 314 by means of its groove 320, and line pressure is thus supplied to the conduits 324, 325 and 326 respectively connected with the first three mentioned ports. The conduit 324 is connected with the port 442 of the third speed valve 87 and thus supplies line pressure to the right end of the valve piston 445. This line pressure, together with the spring 448, hold the piston 445 to the limit of its movement to the left, even though line pressure is supplied from the port 133 and conduit 150 to the right end of the valve piston 445. The governor valve piston 319 is controlled in accordance with the speed of the driven shaft 21 of the vehicle, as is the downshift inhibitor valve 79, and it is assumed that the vehicle speed is so low that the downshift inhibitor valve piston 249 closes the port 244 with respect to line pressure port 241, and line pressure is not supplied to the left end of the plug 444.

One of the ports 134 of the selector valve 77 is connected with the conduit 152, and line pressure is thus applied on the left end of the fourth speed shift valve piston 376 which would function to move the piston to the right against the action of its spring 380. Such shifting movement of the fourth speed valve piston 376 is prevented, however, at this time since the port 312 of the governor valve 78 is connected with the port 314, and line pressure is supplied through the conduit 325 and port 373 to the right end of the fourth speed valve piston 376 so that this line pressure together with the spring 380 function to hold the piston 376 from movement to the right.

As has been previously explained, the transmission is shifted from second speed to third speed by moving the third speed valve piston 445 to the limit of its movement to the right by the application of fluid pressure through the conduit 150 and port 434 on the left end of the piston 445. The pressure from the port 311 of the governor valve 78 transmitted through the conduit 324 to the right end of the valve piston 445, prevents the movement of the piston 445 to the right and thus prevents third speed from being activated, with the selector valve piston 137 being in its "D4" position. As will be hereinafter described, the piston 376 of the fourth speed valve 88 likewise, when shifted to the right against the action of its spring, causes an upshift from third speed to fourth speed; however, with the selector valve piston 137 being in its "D4" position, line pressure is supplied from the governor valve port 312 through the conduit 325 to the right end of the piston 376 and prevents its movement to the right, and fourth speed ratio is likewise not completed.

Under these conditions, with the governor valve piston in its position bridging the ports 311, 312, 313 and 314 by its groove 320, the transmission is in second speed ratio, and a start of the vehicle is made in this ratio. The brakes 30 and 31 are engaged for completing this ratio in the same manner as when the selector valve piston 137 is in its "2" position, and the second speed valve piston 353 is moved to its right hand position to supply line pressure to both the conduits 358 and 359. Although the second speed valve 86 is quite similar to the third speed valve 87 and the fourth speed valve 88, it will be noted that the second speed valve 86 does not receive pressure from the governor valve 78, and the second speed valve piston 353 is free to move to the right to its second speed completing position due to line pressure received from the selector valve 77.

The governor valve piston 319 is controlled both by the speed of the driven shaft 21 of the transmission and by the accelerator 333. The weights 328 are driven from the shaft 21 as previously described, and on increasing speeds of the shaft 21 and of the weights, they will draw the parts 330 and 331 together against the action of the spring 332, and assuming that the part 331 is stationary, the valve piston 319 will be moved to the right. Actually, the part 331 moves along with the accelerator 333, and when the accelerator 333 is moved downwardly toward fully opened throttle position, it will cause a clockwise rotation of the bellcrank 335 through the link 334 and will move the part 331 to the left through the link 336.

When the speed of the shaft 21 increases sufficiently, the piston 319 is moved to the right so as to bridge the ports 312, 313, 314 and 315 with the groove 320, and the port 311 is drained to the sump 127 through the open end of the cavity 318. The port 311 is connected through the conduit 324 with the port 442 for the third speed valve 87, and thus the pressure effective on the right end of the third speed valve piston 445 is removed, and the line pressure effective on the left end of the valve piston 445 through the conduit 150 and port 434 is effective to move the piston 445 to the right to the limit of its movement, in which third speed forward drive is completed as has been previously described. In third speed forward drive, the speed of the shaft 21 may be sufficient so as to move the downshift inhibitor valve piston 249 sufficiently to open the port 244 with respect to the port 241, and the pressure flowing through the port 244 is effective to prevent a movement of the third speed valve piston 445 to the left in a downshifting direction as has been previously described.

When the governor valve piston 319 is in its third speed position as just described, line pressure is admitted to the port 315 and is effective on the small piston 337 to move the piston into contact with the movable part 330. The piston 337 acts as a pressure means to apply an additional force on the part 330 tending to hold it in its upshifted third speed position, once this position has been attained, and causes the speed of the governor 327 at which a downshifting movement of the piston 319 occurs to be substantially less than the speed at which an upshifting movement occurs.

When the speed of the driven shaft 21 of the transmission increases still further sufficiently, the governor valve piston 319 is moved farther to the right so as to connect the ports 313, 314, 315 and 316 by means of the groove 320, draining the ports 311 and 312 to the sump 127 through the open end of the cavity 318. The port 312 is connected by the conduit 325 with the port 373 of the fourth speed valve 88, and the line pressure previously effective on the right end of the fourth speed valve piston 376 is drained and allows the piston 376 to move to the right to the limit of its movement under the effect of the line pressure impressed on the left end of the piston 376 through the conduit 152 and port 363. The piston 376 in this position connects the ports 369 and 368. Line pressure from the modulator valve port 198 is supplied to the port 369 through the conduit 360, and from thence line pressure flows through the groove 378 and conduit 387 to the piston 55 of the clutch 33 to engage the clutch. The modulator valve 81 is effective to provide a restriction in this supply of line pressure to the clutch if the accelerator is in a released position. Line pressure is drained from the piston 60 for the other clutch 34 by this movement of the fourth speed valve piston 376, the flow of fluid from the piston 60 to the sump being through the conduit 382, the port 365, the groove 377, the port 366, the conduit 384, the port 401 in the fifth speed valve 89, the groove 410, the port 400, the conduit 414, the port 418 of the 5–4 shift valve 90, the groove 427 and the port 419. As has been previously noted, the port 419 is relatively restricted, and this is for the purpose of retarding the disengagement of the clutch 34 to assure that the other clutch 33 is engaged prior to disengagement of the clutch 34 so that there can be no complete breakage of the drive through the transmission.

In fourth speed ratio, the transmission is capable of driving the shaft 21 and the vehicle at such speed that the rear pump 76 provides such pressure as to move the downshift inhibitor valve piston 249 to the right so that all of the ports 236, 237, 238 and 239 are in communication with the port 235. The groove 250 at this time connects the ports 242, 243, 244 and 245 with the line pressure supply port 241, and line pressure from the port 245 is supplied through the conduit 260 to the fourth speed valve 88, and particularly to its port 372. Line pressure in port 372 flows through the groove 379 of the fourth speed valve piston 376, port 371, conduit 381 and port 362 to the left end of the plug 375. The application of line pressure to the plug of the fourth speed valve functions in the same manner as in the previously described valves, namely, to assure that the fourth speed valve piston cannot be moved to the left to a downshifting position, even though the selector valve piston 137 is moved into one of its previously described positions, cutting off the supply of line pressure to the fourth speed valve through the conduit 152.

The piston 338 of the governor valve 78 is connected with the line pressure supplied from the port 314 in the fourth speed position of the piston 319, and this piston 338 functions similar to the piston 337 in yieldably holding the governor valve piston 319 in its upshifted position.

The function of the freewheel valve 85 is to eliminate the engagement of the brake 30 for the second speed drive with the selector valve 77 being in its "D4" position. As has been described, the selector valve piston 137 supplies line pressure through the port 363 in the "D4" position of the piston 137, and this pressure is transmitted through the conduit 308 and port 299 to the left end of the freewheel valve piston 305. The piston 305 is thus moved to the limit of its movement to the right against the action of its spring 307 and connects the ports 302 and 301 by means of its groove 306. The port 302 is connected by means of the conduit 297 with the line pressure supply port 198 of the modulator valve 81, and line pressure is thus supplied through the ports 302 and 301, conduit 277 and port 276 to the disapply cavity 266b of the servomotor 262 for maintaining the brake 30 disengaged. A smoother ratio change from second to third or back again from third to second in the "D4" range is obtained with the freewheel brake 29 effective in lieu of the brake 30 as the freewheel brake 29 automatically engages and disengages, depending upon the relative rotation between the inner and outer races of the brake 29.

The transmission controls are put in their "D5" range by moving the selector valve piston 137 into its "D5" position. In this range, the transmission starts in second speed drive, shifts automatically to third speed drive, thereafter shifts automatically to fourth speed drive, and finally shifts automatically to fifth speed drive.

When the selector valve piston 137 is in its "D5" position, the groove 138 connects the port 135, along with the ports 131, 132, 133 and 134, with the line pressure supply port 130. Line pressure is thus supplied through the conduit 153 to the fifth speed valve 89 and is effective on the left end of the fifth speed valve piston 409 which tends to move this piston to the right to the limit of its movement against the action of its spring 412. Assuming, however, that the vehicle speed has not as yet attained a very high value, the fifth speed valve piston 409 remains to the limit of its movement to the left. When the governor valve 319 is in its illustrated position, it connects the line pressure supply port 314 with the port 313, as well as the ports 311 and 312 previously discussed and line pressure is thus supplied through the port 313 and connected conduit 326 and port 406 to the right end of the fifth speed valve piston 409, so that the line pressure augments the action of the spring 412 in holding the piston 409 to the limit of its movement to the left, even though line pressure is supplied through the conduit 153 in the "D5" position of the selector valve piston 137 to the left end of the fifth speed valve piston 409.

The transmission is shifted from second speed drive to third speed drive and finally to fourth speed drive by movements of the governor valve piston 319 successively uncovering the ports 311 and 312, as has been previously described in connection with the "D4" position of the selector valve piston 137. When the speed of the driven shaft 21 increases still further so that the governor valve piston 319, in addition, uncovers the port 313, the line pressure which has previously been in communication with the right end of the fifth speed valve piston 409 through the port 313 is now drained through the port 313, and the valve piston 409 is moved to the limit of its movement to the right against the action of its spring 412 by the line pressure effective through the port 399 on the left end of the piston 409. It should be noted that, even though the speed of the shaft 21 in the "D4" range reached the critical governor speed just described, nevertheless, such a movement of the fifth speed valve piston 409 could not take place, in view of the fact that line pressure in the "D4" range is not supplied to the left end of the fifth speed valve piston 409 through the port 399 and conduit 153.

When the fifth speed valve piston 409 is at the limit of its movement to the right, it connects the ports 402 and 401 by means of the groove 410. Line pressure is supplied from the line pressure supply port 198 of the modulator valve 81 through the conduit 396, the port 402, the port 401 and the conduit 384 to the uppermost port 366 of the fourth speed valve 88. The line pressure in the conduit 385 connected with the conduit 384 flows through the restriction 389 to the disapply cavity 266b of the servomotor 262B for the brake 31, and the brake 31 is thus disengaged, although, due to the existence of the restriction 389, the disengagement is relatively slow.

The fourth speed shift valve piston 376 is, at this time, at the limit of its movement to the right, since the transmission has previously changed into its fourth speed ratio, and line pressure from the port 366 flows through the groove 377 of the shift valve piston 376 to the port 365 and thence through the conduit 382 to the piston 60 for applying the clutch 34. The clutch 33 remains engaged as in fourth speed drive due to the fact that the fourth speed shift valve piston 376 remains in its upshifted position, to the limit of its movement to the right, and thus both the clutches 33 and 34 are engaged to complete the fifth speed drive through the transmission.

The 5–4 shift valve is actuated at the same time as the clutch 34 is engaged for purposes hereinafter to be mentioned. The line pressure from the lower port 366 flows through the conduit 383 and port 416 to be effective on the left end of the plug 425 of the 5–4 shift valve 90 and move the pistons 425 and 426 to the right against the action of the spring 429. With the fourth speed shift valve piston 376 being in its upshifted position, line pressure is supplied from the port 369 to the ports 368 through the groove 378, and line pressure exists in the conduit 386 and port 422 of the 5–4 shift valve 90. When the 5–4 shift valve piston 426 is moved to the limit of its movement to the right, it uncovers the port 422, and line pressure flows through the groove 428, port 421, conduit 430 and port 417 to the left end of the 5–4 shift valve piston 426, and this line pressure from the port 417 in itself holds the piston 426 to the limit of its movement to the right, exclusive of the action of the plug 425.

The transmission is capable of driving the vehicle at a still higher speed in fifth speed drive than in fourth speed drive, and at this higher speed, the output pressure of the pump 76 is sufficiently high to move the inhibitor valve piston 249 to the limit of its movement to the right against the action of the spring 251 so as to connect the port 246, along with the ports 242, 243, 244 and 245, with the line pressure supply port 241. Line pressure supplied to the port 246 flows through the conduit 261 to the fifth speed valve 89, and particularly its port 405. With the piston 409 being at the limit of its movement to the right, line pressure flows through the groove 411, the port 404, the conduit 413 and the port 398 and is applied to the left end of the plug 408. If the conduit 153 is subsequently taken out of communication with line pressure, as by movement of the selector valve piston 137, the fifth speed valve piston 409 nevertheless remains in its upshifted or fifth speed position. This line pressure derived from the downshift inhibitor valve port 246 is similar in its action to that derived from the other ports 242, 243, 244 and 245, in connection with the other shift valves, as will be noted.

Once the governor valve piston 319 has moved into its fifth speed position, line pressure is supplied to the port 317 from the port 314 through the valve groove 320, and this acts on the piston 339 which functions like the pistons 337 and 338 previously mentioned.

Assuming that the speed of the vehicle has dropped sufficiently, the downshift inhibitor valve piston 249 will move into its fourth speed position connecting the ports 241, 242, 243, 244 and 245 but draining the port 246. The port 246 being connected by the conduit 261 with the port 405 of the fifth speed valve 89, will drain the left end of the cylindrical cavity 407 of the valve 89 through the port 398, the conduit 413, the port 404 and the groove 411 so that the fifth speed valve piston 409 may thereafter move to the left. If the selector valve piston 137 is then moved back into its "D4" position, the conduit 153 will be drained to the sump, relieving the pressure effective on the left end of the valve piston 409 of the fifth speed valve 89, and the piston 409 moves under the action of its spring 412 back into its fourth speed position blocking the line pressure supply port 402. The clutch piston 60 for the clutch 34 is then drained through the conduit 382, the port 365, the groove 377, a port 366, the conduit 384, the port 401, the groove 410, the port 400, the conduit 414, the port 418, the groove 427 and the relatively open port 420 in parallel with the restricted port 419 in the position of the 5–4 shift valve piston 426 at the limit of its movement to the right. Due to the effect of the line pressure transmitted through the conduit 430 and port 417 to the left end of the 5–4 shift valve piston 426, the piston 426 remains at the limit of its movement to the right, even though the pressure in the conduit 383 which was initially used for moving the piston 426 to the right, is drained through the lower port 366 in communication with the conduit 384.

The disapply cavity 266b of the servomotor 262B for the brake 31 is also drained for this ratio change, the fluid in draining flowing through the conduit 385, around the ball 391 of the jet valve 388, the branch conduit 390 and the conduit 384 to the sump as mentioned in connection with the clutch 34. The jet valve 388 functions to allow a relatively wide open drain of the servomotor 262B, although the jet 389 is effective for filling the disapply cavity 266b of the servomotor 262B in originally changing from fourth to fifth speed drive. Thus the brake 31 is engaged, and the clutch 34 is disengaged, and the transmission is again in fourth speed drive. Due to the function of the 5–4 shift valve 90, the draining of the clutch 34 and the disapply cavity 266b for the brake 31 are both relatively wide open and unrestricted.

As has been previously described, the push start valve piston 229 is at the limit of its downward movement against the action of the spring 231 whenever there is line pressure existing in the conduits 103 and 233. When, however, the engine of the vehicle is inoperative and no such pressure exists, then the piston 229 is at the limit of its movement upwardly due to the action of the spring 231, and with the piston 229 in this position, fluid under pressure may be derived from the driven shaft pump 76 for engaging the various clutches and brakes of the transmission, so that the vehicle engine can be started by pushing or towing the vehicle. In this case, the groove 230 of the push start piston 229 connects the ports 225 and 226, and fluid pressure from the conduit 220 is supplied to the conduit 204 and connected conduits. The selector valve piston 137 may be put into any of its forward drive positions for the purpose of starting the vehicle engine by pushing or towing the vehicle.

The reverse drive through the transmission may be completed by moving the selector valve piston 137 into its "R" position. In this position the piston 137 connects the ports 129 and 130 by means of the groove 138, and line pressure is thus applied to the conduits 126, 294 and 166. The line pressure in conduit 126 flows through the port 120 of the plug 119 in the pressure regulating valve 82, and the pressure acts on the upper end of the piston 123, so that the stem 124 of this piston is effective on the valve piston 115. The piston 123 thus augments the force due to the spring 125 on the regulator piston 115 and prevents the piston 115 from moving upwardly so as to decrease the pressure from the pump 75 until a higher pressure exists in the conduit 103 with which the piston 115 is in communication. The net effect of the piston 123 on the piston 115 is to cause the pressure regulating valve 82 to cooperate with the pump 75 in such a manner as to cause the pump to provide a higher regulated line pressure in the conduit 103 for the reverse drive as compared to the forward drive. The line pressure for reverse drive may be 160 p.s.i., for example.

Since this higher line pressure exists for reverse drive, it is desirable to reduce the effective cross section of the connection between the pump 75 and the fluid coupling 26, and this is the function of the coupling valve 83. The increased line pressure in the conduit 166 for reverse drive is effective on the upper end of the valve piston 161 to move the piston 161 against the action of its spring 163 into contact with the plug 164, and in this position the piston 161 blocks the restriction 156 but allows the restriction 155 to remain in communication with the conduit 104 and port 158 supplied with line pressure from the pump 75. The flow of fluid through the fluid coupling 26 for reverse drive is thus kept approximately the same as for the forward drives.

A similar reduction in effective size of the conduits connecting the pump 75 with the lubrication conduit 193 is desirable for reverse drive due to the higher line pressure. The line pressure in the conduit 126 is effective through the conduit 195 and the port 186 on the right end of the piston 189 of the lubrication valve 91. Line pressure is supplied, as in the forward drives, from the conduit 103 through the conduits 194 and port 184 to the left end of the piston 189. Since line pressure exists on both ends of the piston 189, the spring 191 is effective to hold the piston 189 at the limit of its movement to the left against the stop 192. The higher line pressure utilized for reverse drive supplied to the port 184 is effective on the right end of the piston 188 to move the piston 188 to the limit of its movement to the left against the action of the spring 190 so as to open the port 182 with respect to the port 184. The two ports 182 and 183 thus supply fluid to the lubrication conduit 193, and since the port 182 is smaller than the port 185 utilized for the forward drives, the approximate quantity of fluid supplied to the conduit 193 for lubrication purposes remains the same for reverse drive as for the forward drives.

The line pressure in the conduit 294 is supplied through the port 285 to the left end of the reverse interlock valve piston 291 and moves the piston 291 to the limit of its movement to the right against the action of the spring 293 so as to connect the ports 288 and 287 by means of the groove 292 in the piston 291. The port 288 is connected by means of the conduit 283 with the line pressure supply port 198 of the modulator valve 81, and the line pressure supplied through the port 288 flows through the groove 292, port 287, conduit 296, port 364 of the fourth speed valve 88, groove 377, port 365 and conduit 382 to the piston 60 of the clutch 34. The clutch 34 is thus engaged, and since the torque carried in reverse drive by the clutch 34 is higher than for the forward drives in which the clutch 34 is used, the clutch is engaged with the greater intensity due to the higher line pressure which is sufficient so that the clutch does not slip. The brake apply cavity 266a in the servomotor 262 for the brake 30 is connected by means of the conduit 263 with the line pressure supply port 198 of the modulator valve 81 as for first and second speed forward drives previously described, and the brake 30 is effective with the freewheel brake 29 to complete the drive through the first planetary gear set 27.

As has just been described, the fluid pressure effective for engaging the clutch 34 for the reverse drive is supplied through the reverse interlock valve 84. The primary purpose of the reverse interlock valve 84 is to prevent the application of the clutch 34 for completing the reverse drive when there is any substantial forward movement of the vehicle. Any substantial forward movement of the vehicle causes the downshift inhibitor valve piston 249 to be moved to the right against the action of its spring 251 so that its groove 250 connects the line pressure port 241 with the port 242. The port 242 is connected through the conduit 257 with the port 289 of the reverse interlock valve to apply line pressure to the right end of the reverse interlock valve piston 291, and such application of line pressure prevents movement of the reverse interlock valve piston 291 to the right to its reverse drive position. The downshift inhibitor valve piston 249 must be in a position corresponding to substantial zero speed of the vehicle in the forward direction in order for the reverse interlock piston 291 to be in its reverse drive position.

The modification of the invention is shown principally in Figs. 8A, 10 and 11. Fig. 8A is simply substituted in place of Fig. 8 in the complete diagram of the transmission controls. In addition to the changes wrought by the substitution of Fig. 8A, the clutch pressure reducing valve 450 is deleted and the conduit 295a shown in dotted lines in Fig. 5 bridging this valve is used instead. In Fig. 9 the conduit 256 between points X is deleted, and the conduit 256a is substituted. In addition, the modified clutch structure shown in Fig. 10 is utilized in place of the clutch 34 shown in Fig. 7.

The principal differences between the modification of the invention and the first embodiment are that the 5–4 shift valve 90 is deleted (see Fig. 8A); the clutch pressure reducing valve 450 is deleted (Fig. 5); a Belleville type washer 470 is used in the modified clutch 34 (see Fig. 10); and a neutral valve 471 is utilized for connecting the downshift inhibitor valve 79 with line pressure (see Fig. 8A).

Referring first to the neutral valve 471, it will be noted that the downshift inhibitor valve 79 in the first embodiment obtains line pressure through the conduit 256 connected with the line pressure port 198 of the modulator valve 81. Line pressure is available from this port for all conditions of operation including neutral, and, as is apparent, the downshift inhibitor valve piston 249 may be shifted to the right against the action of its spring to open one or more of the ports 236, 237, 238 and 239 whenever there is movement of the vehicle, regardless of the fact that the selector valve piston 137 is positioned in its "N" position. This may result in one of the power trains remaining completed, assuming that the vehicle is moving, even though the selector valve piston 137 is returned to its "N" position. In the modified form of the transmission controls, the line pressure supply port 241 of the downshift inhibitor valve 79, instead of being connected with the line pressure supply port 198 of the modulator valve 81 is connected through the neutral valve 471 with the selector valve 77, and this connection is such that no pressure is available to the inhibitor valve port 241 in the neutral position of the selector valve piston 137. This expedient makes it possible for the driver to neutralize the transmission and break all power trains therethrough by moving the selector valve piston 137 into its "N" position, regardless of the fact that the vehicle may be moving at the time.

The neutral valve 471 comprises a casing portion 472 having ports 473, 474, and 475 therein. The casing portion 472 is provided with a cylindrical cavity 477, and a piston 478 is slidably disposed in the cavity 477.

The port 473 is connected with an auxiliary port 129 of the selector valve 77 by means of the conduit 476. The port 474 is connected with the conduit 148 by means of a conduit 482. The port 475 is connected through a conduit 256a with the line pressure supply port 241 of the downshift inhibitor valve 79. The conduit 256a connected with the neutral valve 471 in the modified form of the invention is substituted for the conduit 256 in the first embodiment connected with the line pressure supply port 198 of the modulator valve 81.

When the selector valve piston 137 is moved into its "R" position connecting the ports 129 and 130, line pressure is supplied to the port 129, as before, connected with the conduit 126. Line pressure is supplied through the port 473 of the neutral valve 471 and flows through the cylindrical cavity 477 and port 475 to the conduit 256a connected with the line pressure supply port 241 of the downshift inhibitor valve 79. The piston 478 in this case is at the limit of its movement to the right in the cavity 477 and closes the ports 474 and 131 with respect to the conduit 256a.

When the selector valve piston 137 is moved into any of its forward drive positions, line pressure is supplied to the port 131 from the port 130. The line pressure from the port 131 enters the cylindrical cavity 477 through the port 474 and moves the neutral valve piston 478 to the limit of its movement to the left in the cavity 477. In this case the ports 474 and 475 are connected, and the line pressure is supplied from the port 131 of the selector valve 77 to the conduit 256a and the line pressure supply port 241 of the downshift inhibitor valve 79. The neutral valve piston 478 in this case blocks the port 473 and the conduit 476 from the source of line pressure.

Thus it will be apparent that the neutral valve 471 functions to supply line pressure to the downshift inhibitor valve 79 when the selector valve piston 137 is in any of its forward drive or reverse positions. No pressure is supplied to the conduit 256a and thereby to the downshift inhibitor valve 79 in the neutral position of the selector valve piston 137, since, in this position, the piston 137 blocks line pressure to either of its ports 129 and 131.

The Belleville type washer 470 in the modified form of the clutch 34 shown in Fig. 10 is placed between an axially shortened piston 60a and a pressure plate 479 which acts on the stacked disks 58 and 59 in lieu of the piston 60 in the first form of the invention. The washer 470 is disposed on an axially extending sleeve portion 480 of the pressure plate 479, and a snap ring 481 is provided in the sleeve portion 480 for holding the Belleville washer 470 in place.

It is a characteristic of the particular type of Belleville washer 470 illustrated that it yields, tending to become flattened from its initially belled condition, without any substantial increase in force applied to the Belleville washer. As will be noted, the piston 60a acts on the inner periphery of the Belleville washer 470, and the washer at its outer periphery acts on the pressure plate 479 which compresses the clutch plates 58 and 59 together. Fig. 11 shows the effect of the washer 470 on the disks 58 and 59 of the clutch 34. As fluid pressure is applied to the piston 60a, the piston 60a travels to compress the plates 58 and 59 in frictional engagement, and on intial application of pressure to the piston 60a, it travels from point A to point B on the abscissa of the Fig. 11 graph. When the piston reaches point B, the point where the clearance is taken up, the apply pressure on the clutch plates 58 and 59 increases almost instantaneously from zero to a value shown at C. At this time, the inner periphery of the Belleville washer 470 begins to move away from the ring 481, and the piston 60a travels from point B to point D, the point of full engagement. During this travel between points B and D of the piston, the apply pressure of the clutch plates 58 and 59 has no substantial increase, remaining substantially at the apply pressure shown by the point C. This is due to the characteristic of the washer 470 of providing little increased force on its outer periphery even though its inner periphery is moved a substantial distance. During the piston travel from B to D a definite period of time is provided at a controlled apply pressure which is less than the maximum during which the clutch can slip and effect a smooth engagement. Subsequent rapid rise of pressure at point D to maximum has no effect on the smoothness of the engagement because the clutch had already stopped slipping before point D was reached. The controlled slip time, of course, is possible only because oil can be supplied the clutch at a limited rate because of limitations on pump capacity.

In the modification of the controls, the 5–4 shift valve 90 is deleted, and so are its supply conduits 383, 386 and 414. The lower port 366 of the fourth speed valve 88 connected with the conduit 383 in the first embodiment is simply closed, and this is also true of the lower port 368 connected with the conduit 386 of the first embodiment. The port 400 of the fifth speed valve 89 connected with the conduit 414 in the first embodiment is simply opened to freely discharge fluid into the sump 127.

An additional change in the modification is the deletion of the clutch pressure reducing valve 450 and connecting the valve ports 437 and 286 without restriction by means of the conduit 295.

As will be apparent from a consideration of the previously described operation of the 5-4 shift valve 90, its principal function is to make the restricted bleed orifice 419 effective for the disengaging fluid flow for the clutch 34 when the transmission is changed from third to fourth speed ratio, at which time the clutch 34 is disengaged and the clutch 33 is engaged in lieu thereof. On a downshift from fifth speed ratio to fourth speed ratio, however, the 5-4 shift valve 90 operates to allow an unimpeded fluid flow for disengaging the clutch 34, so that the clutch disengages sooner than otherwise and provides a very temporary breakage of drive through the transmission to allow the vehicle engine to speed up to correspond with the lower fourth speed ratio. The purpose of the clutch pressure reducer valve 450 is to reduce the flow of fluid pressure through the conduit 295 when applying the clutch 34 for third speed ratio but allowing a free drainage of the fluid from the clutch 34 when changing from third speed ratio to second speed ratio.

With the modified arrangement, the fluid discharged from the clutch 34 is unimpeded from the fifth speed valve 89 either in changing from fourth to fifth speed ratio or from fifth speed ratio to fourth speed ratio. The use of the Belleville washer 470 between the clutch piston 60a and the pressure plate 479 makes unnecessary the use of the valve 450 and the 5-4 shift valve 90 with its restriction 419, since when the piston 60a is either moving in an engaging or disengaging direction, it moves between the points B and D in its travel during which there is little change in the engaging force effective on the clutch plates of the clutch 34, allowing the brakes or clutches, as the case may be, for making a change of drive along with the clutch 34 to become engaged or disengaged as the piston 60a travels between the points B and D in Fig. 11. The duration of time for disengaging the clutch 34 is, incidentally, approximately the same as though the 5-4 shift valve 90 and the jet 419 were used, and the engagement time of the clutch 34 is about the same as with the use of the valve 450 in the first embodiment, since clutch action does not vary substantially between the points B and D in Fig. 11.

Our improved transmission controls advantageously allow the manual selection at the option of the vehicle operator of a reverse drive, a low speed or first drive, a second speed drive and a third speed drive. The vehicle operator also may select a drive range in which the transmission starts in second speed ratio then subsequently shifts to third speed ratio automatically and finally shifts to a fourth speed ratio automatically. The operator also may select another automatic drive range in which the same shifts take place as in the other automatic range but an additional automatic change to fifth speed ratio takes place.

We wish it to be understood that our invention is not to be limited to the specific constructions and arrangements shown and described, except only insofar as the claims may be so limited, as it will be apparent to those skilled in the art that changes may be made without departing from the principles of the invention.

We claim:

1. In a transmission, the combination of a drive shaft, a driven shaft, means for providing a low speed power train between said shafts, means for providing a high speed power train between said shafts, means operatively associated with said first two-named means for changing from said low speed power train to said high speed power train and including a shift valve having a low speed position and a high speed position, means under operator control including a selector valve connected to said shift valve for selectively applying fluid pressure to said shift valve tending to move the shift valve from its low speed position to its high speed position, means including a governor valve connected to said shift valve for canceling the effect of said selector valve by applying fluid pressure to said shift valve and preventing such movement of said shift valve, said governor valve having a low speed position in which it is so effective and a high speed position for removing its said application of pressure to said shift valve, and a governor under the control of said driven shaft and operatively associated with said governor valve for moving said governor valve from its low speed position to its high speed position when the speed of said driven shaft increases above a predetermined speed.

2. In a transmission, the combination of a drive shaft, a driven shaft, means for providing a low speed power train between said shafts, means for providing an intermediate speed power train between said shafts, means for providing a high speed power train between said shafts, means operatively associated with said means for providing a low and an intermediate power train between said shaft for changing from said low speed train to said intermediate speed train and including a shift valve, means operatively associated with said means for providing an intermediate and a high speed power train between said shafts for changing from said intermediate speed train to said high speed train and including a similar second shift valve, means connected to said shift valves for applying a fluid pressure to each of said shift valves tending to move them from their relatively low speed drive positions to their relatively high speed drive positions, means connected to said shift valves for applying a fluid pressure to each of said shift valves for holding the valves from such movement and including a governor valve having a low and an intermediate and a high speed position, said governor valve applying fluid pressure to both of said shift valves in its low speed position and draining such fluid pressure on said first-named shift valve in its intermediate speed position and draining the fluid pressure on both of said shift valves in its high speed position, and a governor under the control of said driven shaft and operatively associated with said governor valve for moving said governor valve from its low to its intermediate and finally to its high speed position as the speed of said driven shaft increases.

3. In a transmission, the combination of a drive shaft, a driven shaft, means for providing a low speed power train between said shafts, means for providing a high speed power train between said shafts, means operatively associated with said first two-named means for changing the drive between said power trains and including a drive controlling shift valve having a low speed position and a high speed position, means connected with said shift valve for at times applying a pressure to said shift valve holding it in its high speed position and including inhibitor valve means supplying fluid pressure to said shift valve above a predetermined speed of said driven shaft, and governor controlling means operatively associated with said inhibitor valve means including a pump driven by said driven shaft discharging fluid through an orifice and thereby providing a fluid pressure that increases with the speed of said driven shaft and effective on said inhibitor valve means.

4. In a transmission, the combination of a drive shaft, a driven shaft, means for providing a plurality of different ratio power trains between said shafts, means operatively associated with said first-named means for changing between said power trains and including a plurality of shift valves each having a relatively low and high speed position for changing from a relatively low speed drive to a relatively high speed drive, means connected to said shift valves for progressively applying a pressure to said shift valves for holding one and then additional ones of said shift valves in the high speed position of each and including an inhibitor valve progressively opening ports to one and then additional ones of said shift valves, and governor means operatively associated with said inhibitor valve and effective on said inhibitor valve for opening said ports progressively in accordance with the speed of the driven shaft of the transmission and including a pump driven by said driven shaft the output pressure of which is effective on said inhibitor valve and means operatively associated with said inhibitor valve providing a plurality of orifices relieving the pressure of said pump as said inhibitor valve moves progressively to its various positions opening additional ones of said ports.

5. In a transmission, the combination of a drive shaft, a driven shaft, means for providing a reverse drive power train between said shafts and including a shift valve opening a conduit to supply fluid pressure to a reverse drive power train completing friction engaging means, an inhibitor valve which opens a port connected to said shift valve to supply fluid pressure to said shift valve to prevent its moving into its power train completing position when there is any forward rotation of said driven shaft, and means operatively associated with said inhibitor valve and operative to move said inhibitor valve to its port opening position when said driven shaft is rotating in the forward direction and including a pump driven by said driven shaft having its output pressure effective on said inhibitor valve, and means operatively associated with said inhibitor valve and providing an orifice for the relief of the output pressure of said pump so that it varies in accordance with driven shaft speed.

6. In a friction engaging device, a piston having an apply side for applying said friction device when fluid pressure is applied thereon, a spring acting to disengage said device, said piston having a disapply side so that said spring disengages said device when the same pressure is applied onto both sides of said piston, and a valve having two pressure exposed surfaces for connecting the two sides of said piston and subject on each surface to the fluid pressure on the respective side of said piston to be opened when the fluid pressure is approximately the same on both sides of the piston and closing when fluid pressure exists on only the apply side of said piston.

7. In a friction engaging device, a fluid pressure operated piston for engaging said device and having an apply side on which fluid pressure is applied for engaging the device and having an opposing disapply side, a spring for disengaging said friction device when substantially the same fluid pressure is applied to both the apply and disapply sides of said piston, a valve for connecting the apply and disapply sides of said piston and opening due to pressure applied on the disapply side of said piston and closing due to pressure on the apply side of said piston, and a spring effective on said valve tending to open the valve so that when the fluid pressure on the disapply side of said piston reaches nearly the pressure applied on the apply side of said piston the valve opens to equalize the fluid pressure on the apply and disapply sides of the piston.

8. In transmission mechanism for an automotive vehicle having an engine with a fuel intake manifold, the combination of a drive shaft, a driven shaft, means for completing a power train between said shafts and including a friction engaging device, a fluid pressure motor for engaging said device, means for supplying fluid under pressure to said motor for engaging said device, a fluid restriction in said supplying means for restricting the fluid flow to said motor for delaying application of said friction device, a valve in parallel with said restriction for at times bypassing said restriction and allowing a fast engagement of said device, and a vacuum motor effective to move said valve and connected with the fuel intake manifold of the vehicle engine so as to be responsive to changes in vacuum therein.

9. In a transmission for an automotive vehicle having an engine with a fuel intake manifold, the combination of a drive shaft, a driven shaft, means for completing a power train between said shafts and including a friction engaging device for completing the train, a fluid pressure operated servomotor for engaging said device, means for supplying fluid under pressure to said servomotor and including a restriction for delaying the application of fluid to the motor, a valve connected in parallel with said restriction for at times bypassing fluid around the restriction to provide a fast application of fluid pressure to said motor, a vacuum motor connected with said valve and connected with said vehicle engine manifold so as to close the valve when the manifold vacuum is high, and a spring operative on said valve and vacuum motor for opening said valve when the vacuum in said manifold is low.

10. In transmission mechanism; the combination of a drive shaft; a driven shaft; means for providing a relatively low speed drive and a relatively high speed drive between said shafts; means operatively associated with said first-named means for completing said low speed drive including a one-way engaging device and a first friction engaging device in parallel with the one-way device; means operatively associated with said first-named means for completing said high speed drive including a second friction engaging device; a selector member having a low speed drive position and an automatic drive position; means operatively connecting said selector member and said first friction engaging device for engaging the device to complete said low-speed power train with a two-way drive when the selector member is in its low speed position; and automatic controlling means connected with said selector member and made operable by said selector member when in its automatic drive position for first completing the low speed drive by means of said one-way engaging device and subsequently automatically completing said high speed drive by engaging said second friction engaging device causing said one-way device to overrun, said last-named means including a servomotor for said first friction engaging device having a fluid pressure apply cavity to which fluid pressure is admitted for both of said low speed high speed drives and having a fluid pressure disapply cavity, and means connected to and under the control of said selector member for admitting fluid under pressure to said disapply cavity when the selector member is in its automatic drive position.

11. In transmission mechanism, the combination of a drive shaft, a driven shaft, a hydrodynamic device driven by said drive shaft, planetary gearing driven by said hydrodynamic device and driving said driven shaft, said planetary gearing including a plurality of fluid pressure engaged friction engaging devices for completing various forward drive power trains and a reverse drive power train between said shafts, a source of fluid pressure, a selector valve connected with said pressure source for rendering certain of said friction devices operative for the forward drives in forward drive positions of the selector valve and for rendering certain of said friction devices operative for a reverse drive in a reverse drive position of the selector valve, means under the control of said selector valve for raising the pressure of said pressure source from a predetermined low pressure for the forward drives to a predetermined high pressure for the reverse drive, means providing a conduit connecting said pressure source and said hydrodynamic device for supplying fluid to the hydrodynamic device, a restriction in said conduit for restricting the flow from said source of pressure to said hydrodynamic device for the reverse drive, and a valve bypassing said restriction for increasing the flow from said source to said hydrodynamic device for the forward drives, said bypass valve being connected with said selector valve so as to be controlled by pressure therefrom so as to be in its restriction bypassing position for said forward drives and to be in its other position for said reverse drive.

12. In transmission mechanism, the combination of a drive shaft, a driven shaft, planetary gearing for providing a forward drive and a reverse drive between said shafts and including fluid pressure engaged friction engaging devices for completing the various drives between the shafts, a source of fluid pressure connectible with said friction engaging devices for engaging them, means for regulating the pressure of said source to a predetermined low pressure for the forward drive and to a predetermined high pressure for the reverse drive, conduit means for connecting said pressure source and said gearing to supply lubricating fluid to the gearing, a restriction in said conduit means for limiting the flow of fluid from said pressure source at its high pressure for the reverse drive, and valve means for bypassing said restriction for admitting a greater flow of lubricating fluid to the gearing when the pressure source is at its low pressure.

13. In transmission mechanism for an automotive vehicle, the combination of a drive shaft adapted to be driven by the vehicle engine, a driven shaft adapted to drive the vehicle, planetary gearing for providing a forward drive and a reverse drive between said shafts and including fluid pressure engaged friction engaging devices for completing the various drives between the shafts, a pump driven by said drive shaft for providing pressures for said friction devices, a selector valve having a forward drive and a reverse drive position and connecting said pump with certain of said devices for completing a forward drive and with certain others of said devices for completing a reverse drive respectively, regulating valve means for regulating the pressure from said pump at a predetermined low value when said selector valve is in its forward drive position and for regulating the pressure from said pump at a predetermined high value when said selector valve is in its reverse drive position, a conduit for connecting said pump and said gearing for providing lubricating fluid to said gearing, a relatively small restriction in said conduit which provides a minimum flow of lubricating fluid to said gearing under engine idling conditions, means providing a large sized passage in parallel with said restriction for providing a larger flow of fluid through said conduit under said relatively low pressure from said pump, a first lubrication valve subject to the output pressure of said pump and opening said passage when said output pressure increases to said low pressure value, an intermediate sized restriction in said conduit in parallel with the other restriction for providing a lubricant flow to said gearing when said gearing is effective to provide said reverse drive, a second lubrication valve subject to the pressure output of said pump and opening said intermediate sized restriction when said pump output approaches said high pressure value, and means effective for closing said first lubrication valve and said large sized passage when said selector valve is moved into its reverse drive position.

14. In transmission mechanism, the combination of a drive shaft, a driven shaft, means for completing a power train between said shafts and including a fluid pressure operated device for completing the train, a pump driven by said drive shaft for providing fluid pressure for said device, a pump driven by said driven shaft for at times providing fluid pressure for said device, a valve subject to the pressure from said drive shaft pump for blocking the output of said driven shaft pump to said device when there is pressure output from said drive shaft pump, and means providing an orifice open to atmosphere and connected with said driven shaft pump for allowing the pressure output of said driven shaft pump to discharge through the orifice and thereby vary with the speed of said driven shaft, said valve being constructed to connect said driven shaft pump with said fluid pressure operated device and to block said orifice with respect to said driven shaft pump when there is no pressure output from said drive shaft pump.

15. In transmission mechanism, the combination of a drive shaft, a driven shaft, means for providing relatively low and intermediate and high speed drives between said shafts, said means for providing low and high speed drives including a fluid pressure engaged friction engaging device for completing each of the said drives, a conduit for draining said device for changing either from low to intermediate speed drive or from high to intermediate speed drive, and valve means in said conduit for providing a restriction in said conduit for a change from low to intermediate speed drive but bypassing said restriction for the change from high speed drive to intermediate speed drive.

16. In transmission mechanism, the combination of a drive shaft, a driven shaft, means for providing low and intermediate and high speed drives between said shafts, said means including a fluid pressure engaged friction engaging device for completing both the low and high speed drives, a conduit connected with said fluid pressure engaged device which is drained for the change from low to intermediate speed drive or from high to intermediate speed drive, a restriction in said conduit for slowing the disengagement of said device and a passage bypassing said restriction, a valve in said conduit operable in a first position to close said bypass passage and in a second position to open said bypass passage, a spring effective on said valve for holding it in its first position so that the restriction is effective for a change from low to intermediate speed drive, and means effective on said valve to hold it against its spring when the transmission is in high speed drive so that said bypass passage is effective for a change from high speed drive to intermediate speed drive.

References Cited in the file of this patent

UNITED STATES PATENTS

| | | |
|---|---|---|
| 2,175,235 | Whittington | Oct. 10, 1939 |
| 2,213,383 | Canfield | Sept. 3, 1940 |
| 2,513,192 | McFarland | June 27, 1950 |
| 2,516,203 | Greenlee | July 25, 1950 |
| 2,516,208 | Hasbany | July 25, 1950 |
| 2,540,965 | Schellinger | Feb. 6, 1951 |
| 2,596,367 | Browne | May 13, 1952 |
| 2,603,109 | Farkas | July 15, 1952 |
| 2,604,197 | Livermore | July 22, 1952 |
| 2,605,863 | Talboys et al. | Aug. 5, 1052 |
| 2,623,411 | Herndon | Dec. 30, 1952 |
| 2,627,189 | McFarland | Feb. 3, 1953 |
| 2,633,035 | Livermore | Mar. 31, 1953 |
| 2,638,750 | Hettinger | May 19, 1953 |
| 2,640,373 | Jandasek | June 2, 1953 |
| 2,645,135 | Frank | July 14, 1953 |
| 2,645,137 | Roche | July 14, 1953 |
| 2,655,654 | Kelley | Oct. 13, 1953 |
| 2,667,085 | Ackerman | Jan. 26, 1954 |
| 2,675,678 | English | Apr. 20, 1954 |
| 2,689,489 | Storer et al. | Sept. 21, 1954 |
| 2,693,260 | Lucia | Nov. 2, 1954 |
| 2,737,824 | Livermore | Mar. 13, 1956 |
| 2,845,817 | Polomski | Aug. 5, 1958 |
| 2,865,227 | Kelley et al. | Dec. 23, 1958 |

FOREIGN PATENTS

| | | |
|---|---|---|
| 974,256 | France | Sept. 27, 1950 |